(12) United States Patent
Lee et al.

(10) Patent No.: US 11,966,106 B2
(45) Date of Patent: Apr. 23, 2024

(54) OPTICAL PATH CONTROL MEMBER AND DISPLAY DEVICE COMPRISING SAME

(71) Applicant: LG INNOTEK CO., LTD., Seoul (KR)

(72) Inventors: In Hae Lee, Seoul (KR); Won Seok Choi, Seoul (KR); Chan Mi Ju, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/921,223

(22) PCT Filed: Apr. 15, 2021

(86) PCT No.: PCT/KR2021/004730
§ 371 (c)(1),
(2) Date: Oct. 25, 2022

(87) PCT Pub. No.: WO2021/221358
PCT Pub. Date: Nov. 4, 2021

(65) Prior Publication Data
US 2023/0161187 A1 May 25, 2023

(30) Foreign Application Priority Data

Apr. 29, 2020 (KR) .................. 10-2020-0052131
May 8, 2020 (KR) .................. 10-2020-0055063

(51) Int. Cl.
*G02F 1/13* (2006.01)
*G02F 1/1339* (2006.01)
(Continued)

(52) U.S. Cl.
CPC ........ *G02F 1/1323* (2013.01); *G02F 1/13394* (2013.01); *G02F 1/137* (2013.01);
(Continued)

(58) Field of Classification Search
CPC .... G02F 1/1323; G02F 1/1339; G02F 1/1341; G02F 1/13394; G02F 2001/13396;
(Continued)

(56) References Cited

U.S. PATENT DOCUMENTS 9,691,350 B2 6/2017 Lee et al.
2008/0309865 A1* 12/2008 Sugita ............... G02F 1/133382
349/149
(Continued)

FOREIGN PATENT DOCUMENTS

JP 2019-20486 A 2/2019
KR 20090002922 A * 7/2007
(Continued)

OTHER PUBLICATIONS

English translation of KR-20180004879-A, You et al. (Year: 2016).*
(Continued)

*Primary Examiner* — Jonathan Y Jung
(74) *Attorney, Agent, or Firm* — Birch, Stewart, Kolasch & Birch, LLP

(57) ABSTRACT

An optical path control member according to an embodiment comprises: a first substrate; a first electrode disposed on the first substrate; a second substrate disposed on the first substrate; a second electrode disposed under the second substrate; and a light conversion part disposed between the first electrode and the second electrode, wherein: each of the first substrate and the second substrate includes a first direction, a second direction different from the first direction, and a third direction defined as a thickness-direction of the first substrate and the second substrate; the light conversion part includes a partition wall part and a reception part alternately arranged; and the reception part has a light transmittance changing according to application of a voltage, extends in a fourth direction, and has a lower surface
(Continued)

inclined at an acute angle with respect to one side surface of the first substrate.

15 Claims, 18 Drawing Sheets

(51) Int. Cl.
*G02F 1/137* (2006.01)
*G02F 1/167* (2019.01)
*G02F 1/1676* (2019.01)
*G02F 1/1679* (2019.01)
*G02F 1/1685* (2019.01)

(52) U.S. Cl.
CPC ............ *G02F 1/167* (2013.01); *G02F 1/1676* (2019.01); *G02F 1/1679* (2019.01); *G02F 1/1685* (2019.01); *G02F 2201/07* (2013.01); *G02F 2201/44* (2013.01); *G02F 2202/28* (2013.01)

(58) Field of Classification Search
CPC ... G02F 1/167; G02F 1/1676; G09G 2358/00; G09G 2320/068; H04N 2013/403
See application file for complete search history.

(56) References Cited

U.S. PATENT DOCUMENTS

| | | | | |
|---|---|---|---|---|
| 2009/0195642 | A1* | 8/2009 | Fukushima | H04N 13/317 348/E13.001 |
| 2011/0170194 | A1* | 7/2011 | Kashiwagi | G02B 5/0236 359/599 |
| 2015/0138247 | A1* | 5/2015 | Gan | G09G 3/344 345/107 |
| 2017/0085865 | A1* | 3/2017 | Sumi | H04N 13/305 |
| 2020/0050033 | A1* | 2/2020 | Galwaduge | G02F 1/1685 |
| 2021/0088868 | A1 | 3/2021 | Gauthier et al. | |

FOREIGN PATENT DOCUMENTS

| | | | |
|---|---|---|---|
| KR | 10-2009-0002922 A | | 1/2009 |
| KR | 10-1091264 B1 | | 12/2011 |
| KR | 10-2012-0131611 A | | 12/2012 |
| KR | 20150125051 A | * | 4/2014 |
| KR | 10-2014-0053740 A | | 5/2014 |
| KR | 10-2015-0125051 A | | 11/2015 |
| KR | 10-2015-0127658 A | | 11/2015 |
| KR | 20180004879 A | * | 7/2016 |
| KR | 10-2018-0004879 A | | 1/2018 |
| KR | 10-2019-0026502 A | | 3/2019 |

OTHER PUBLICATIONS

English translation of KR-20150125051-A, Kim et al. (Year: 2014).*

* cited by examiner

【FIG. 1】
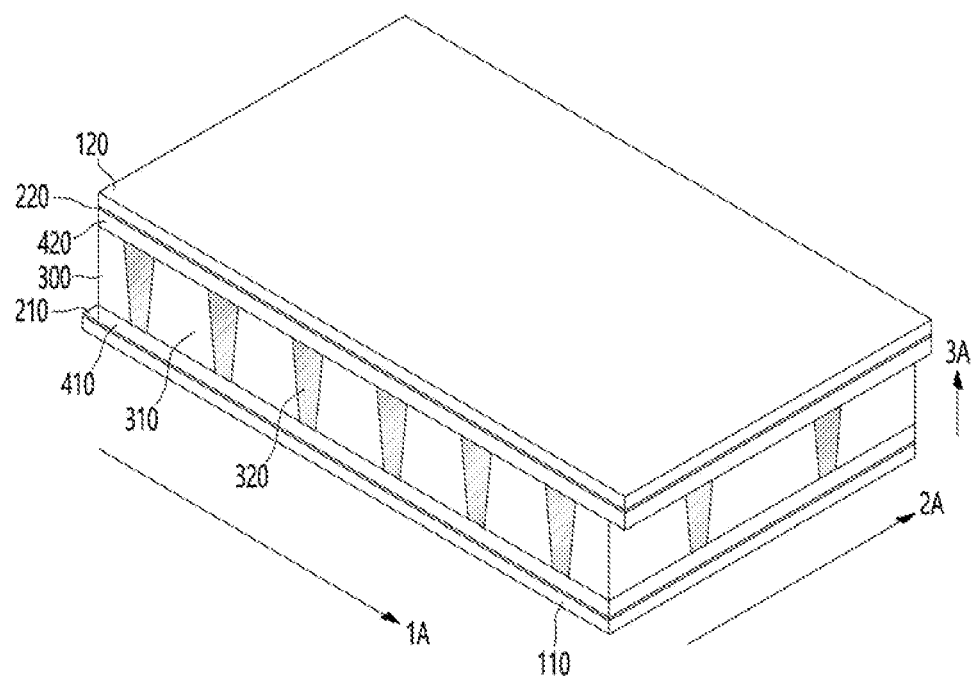
【FIG. 2】
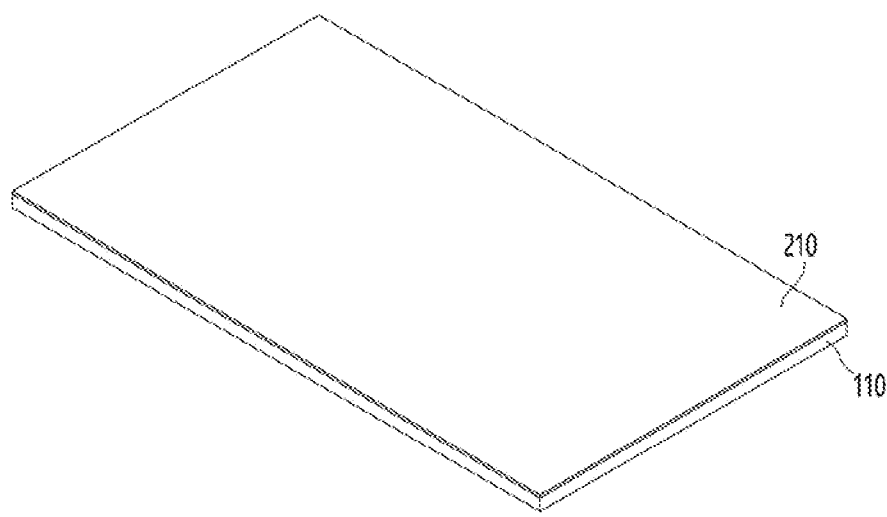

【FIG. 3】
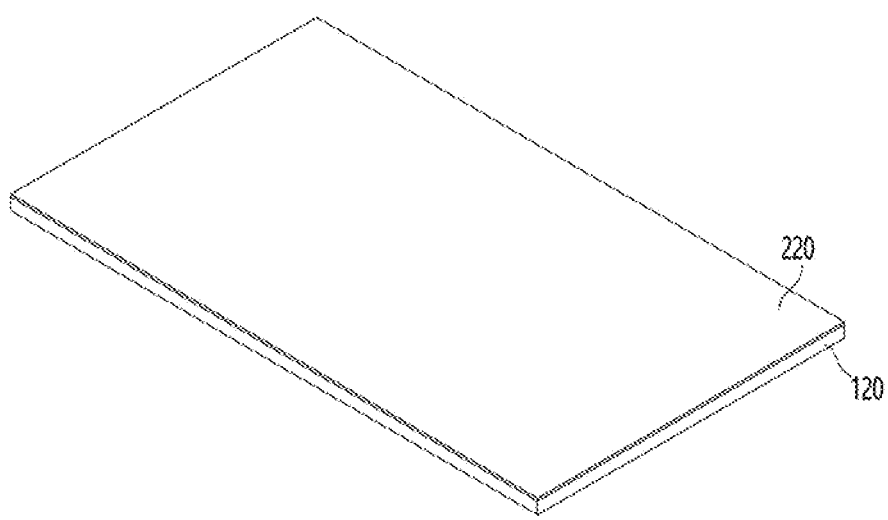
【FIG. 4】
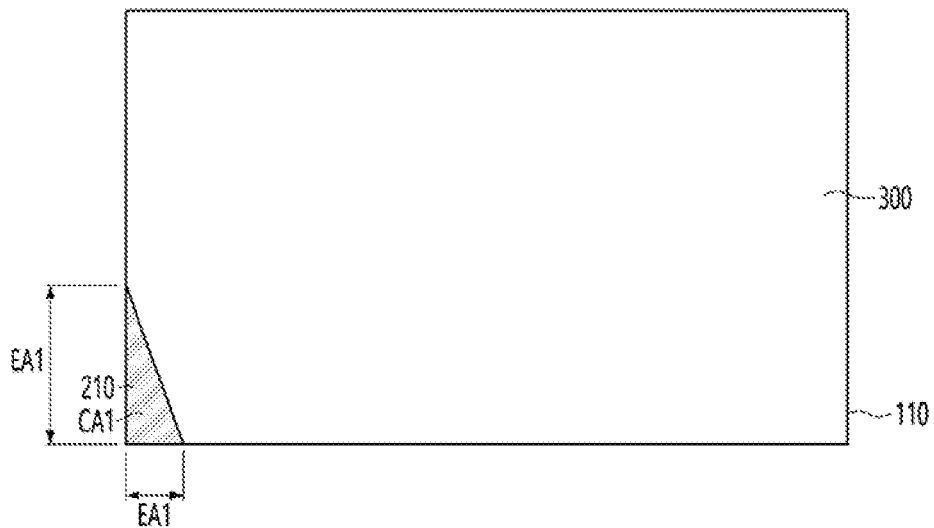

【FIG. 5】
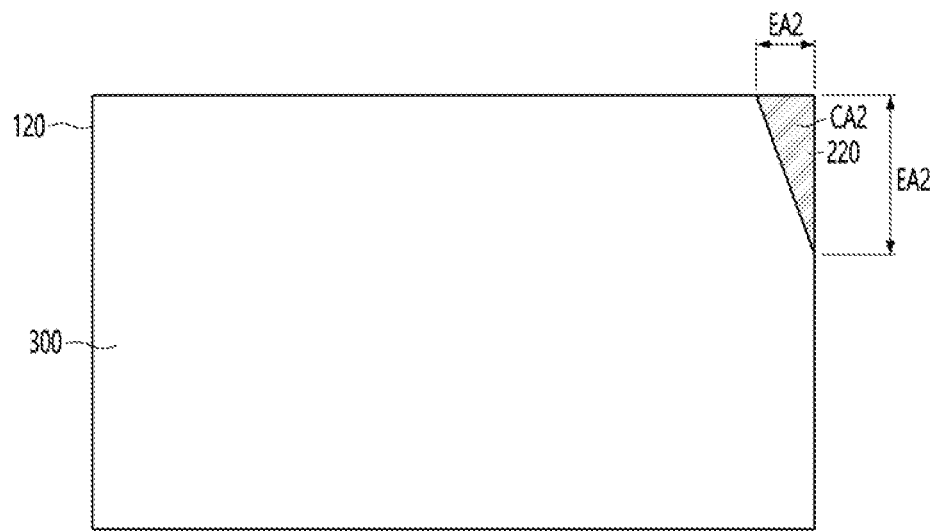
【FIG. 6】
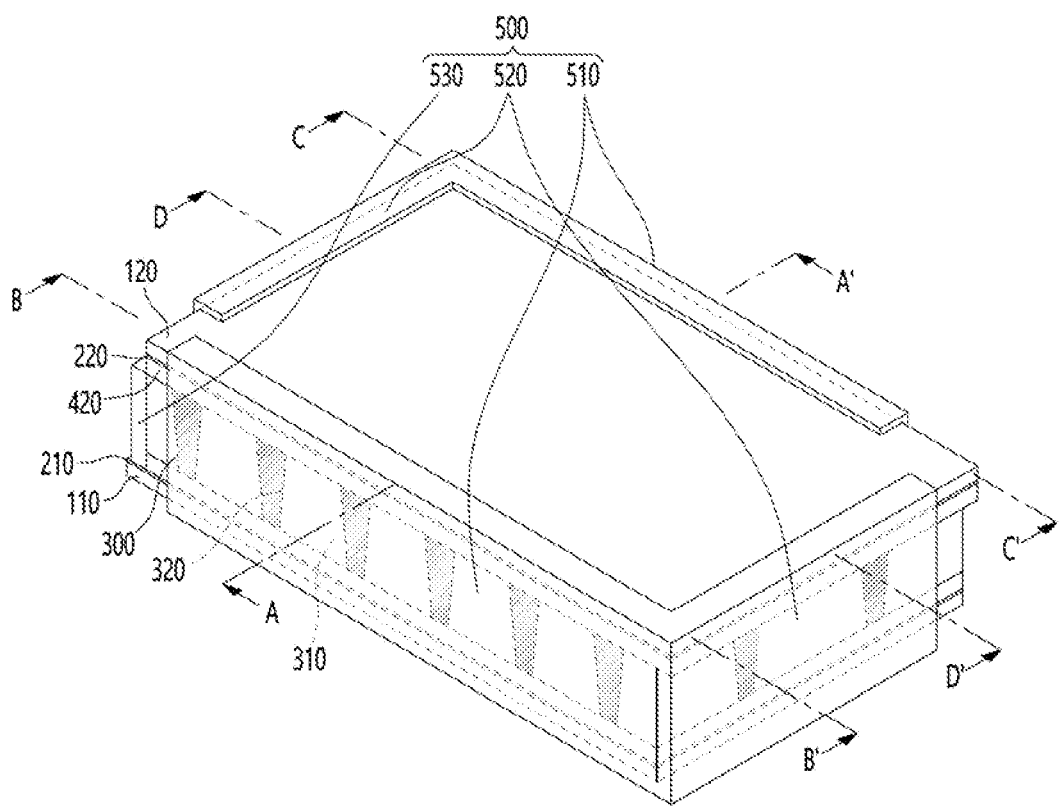

【FIG. 7】
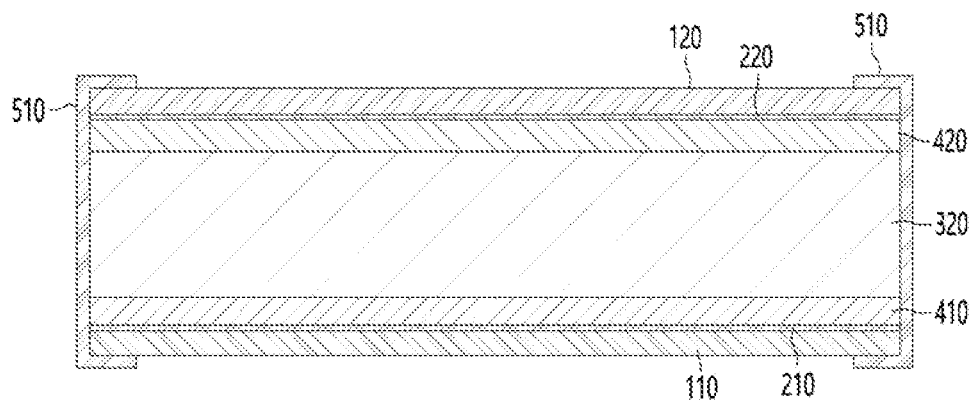
【FIG. 8】
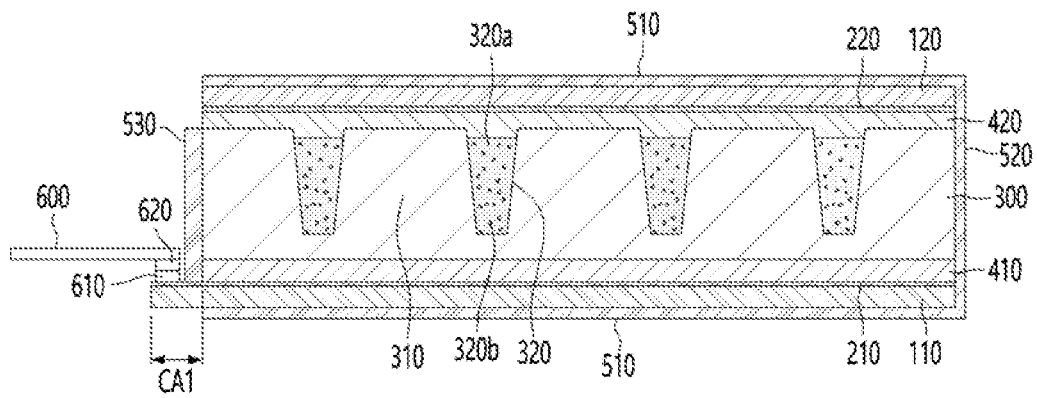
【FIG. 9】
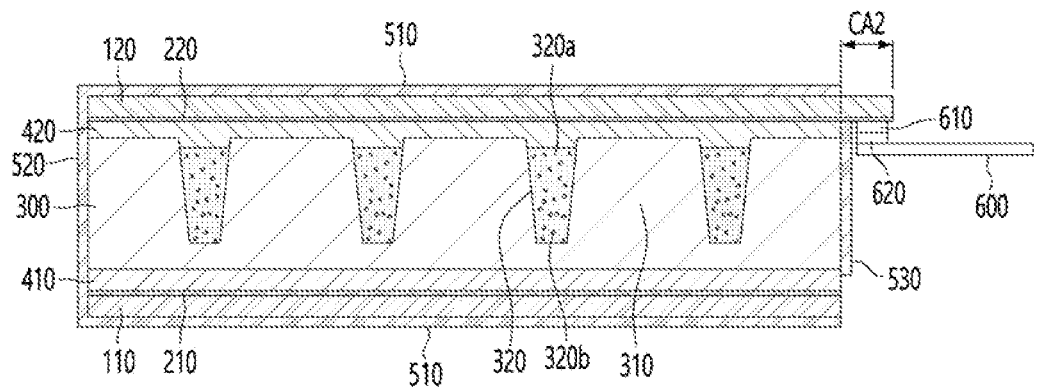

[FIG. 10]
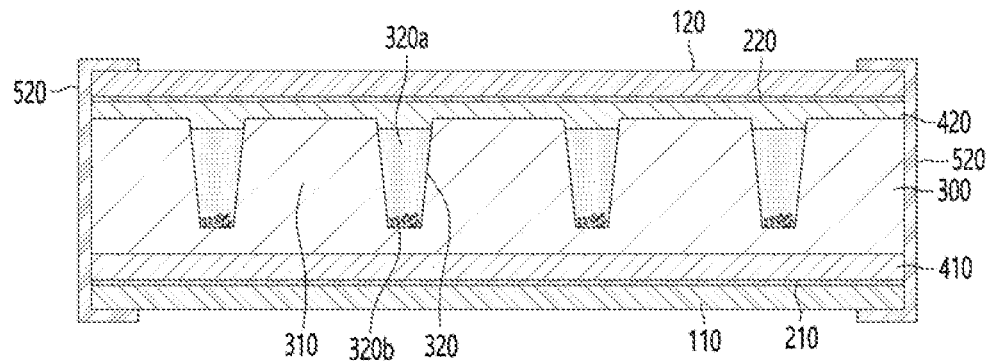
[FIG. 11]
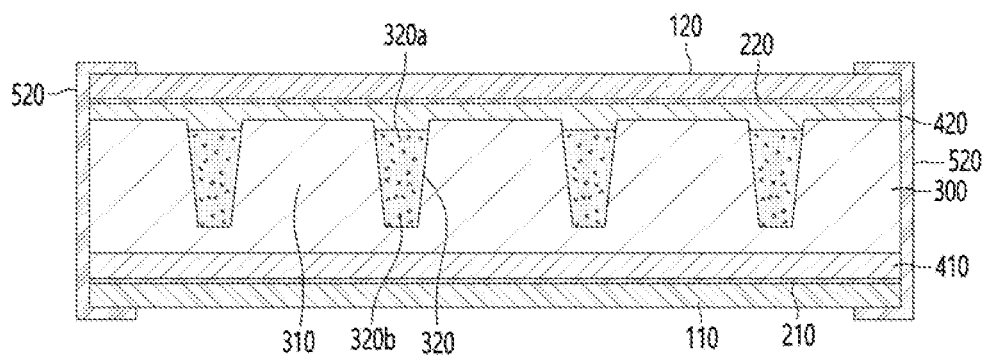
[FIG. 12]
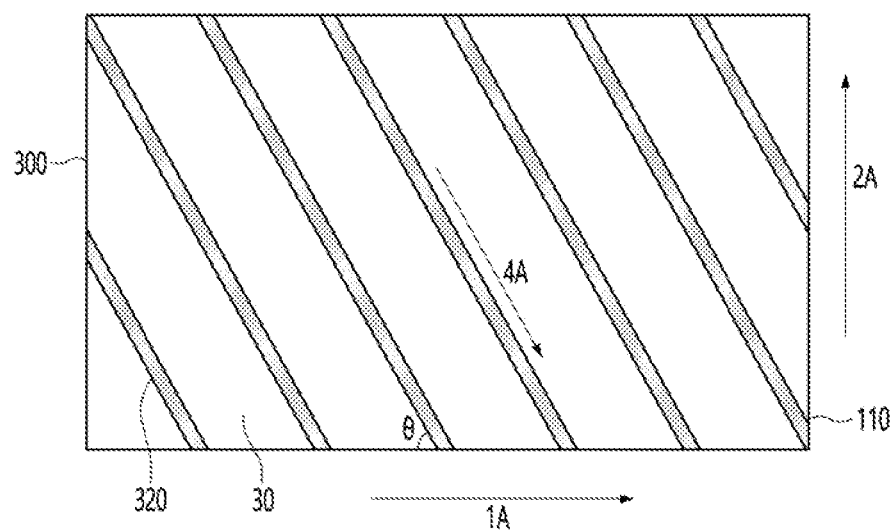

[FIG. 13]
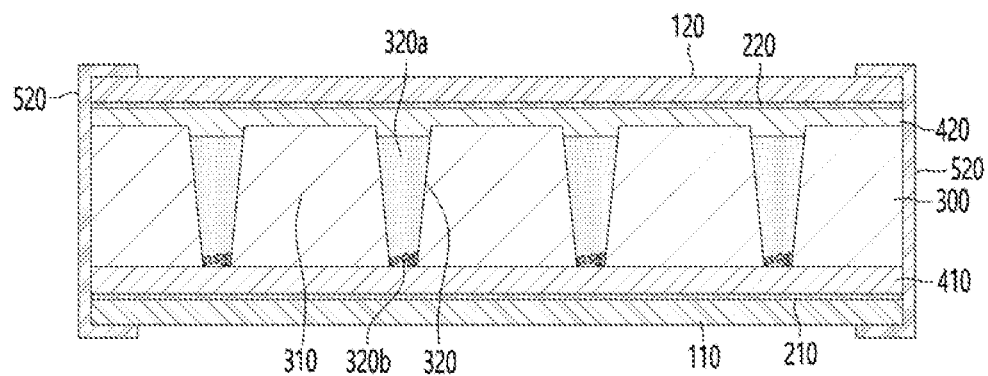
[FIG. 14]
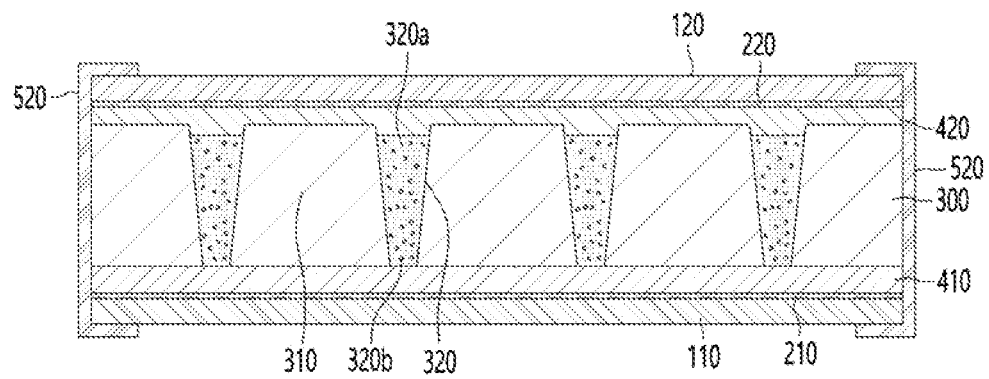
[FIG. 15]
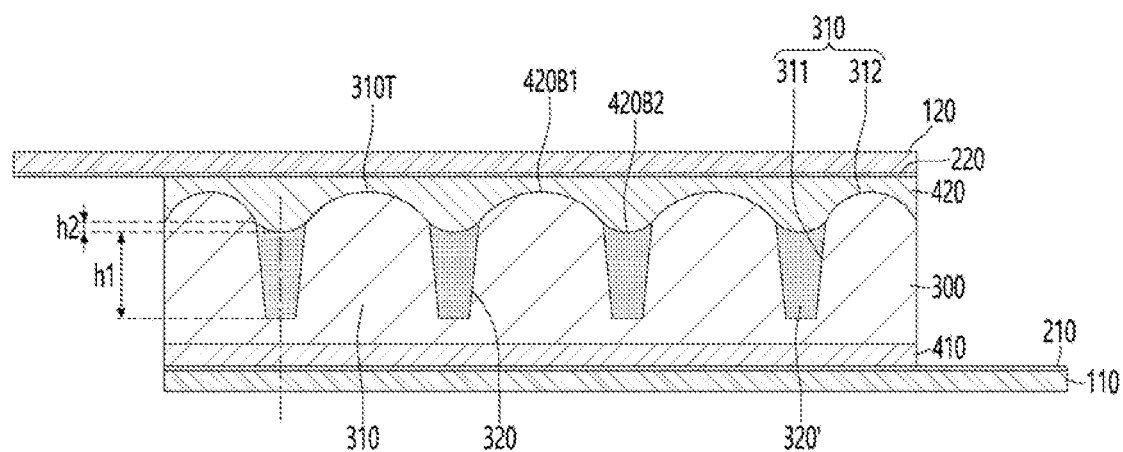

[FIG. 16]
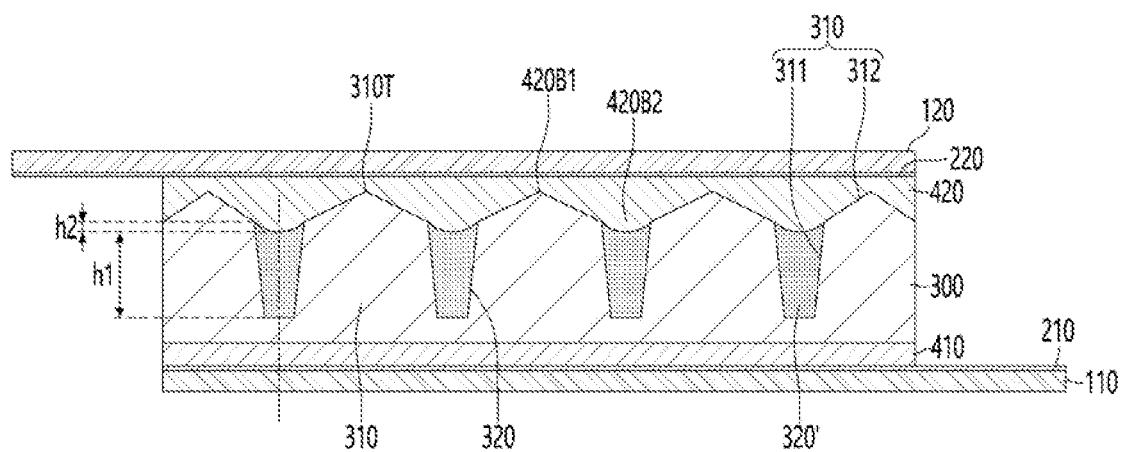
[FIG. 17]
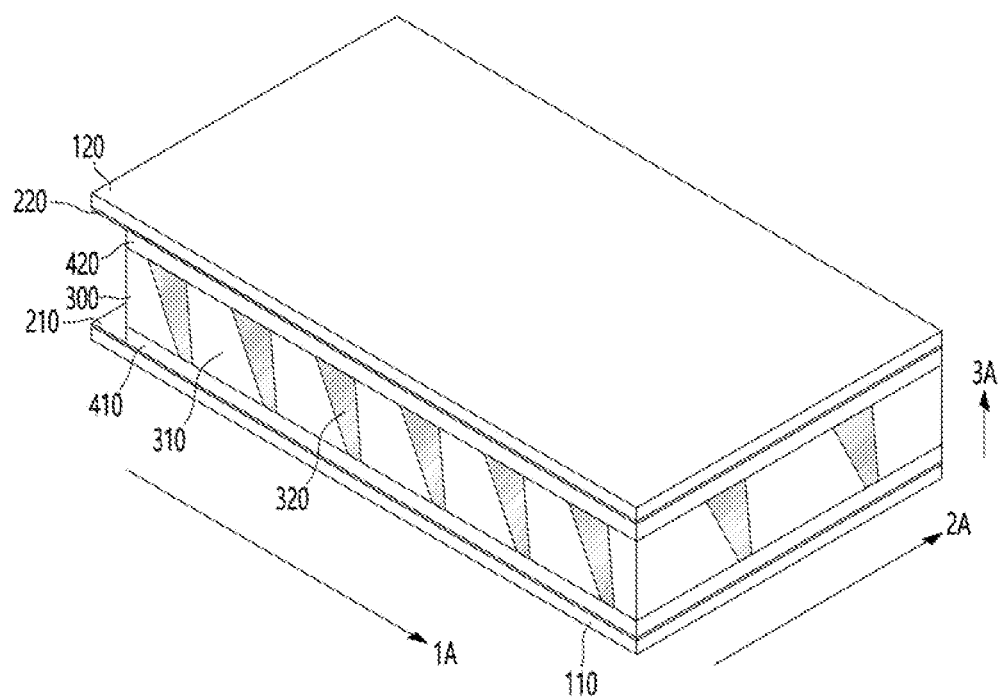

[FIG. 18]
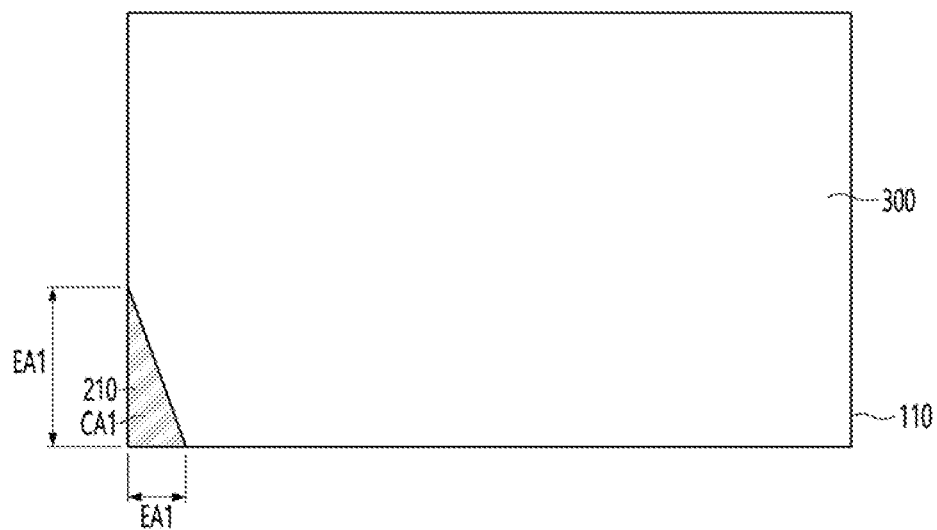
[FIG. 19]
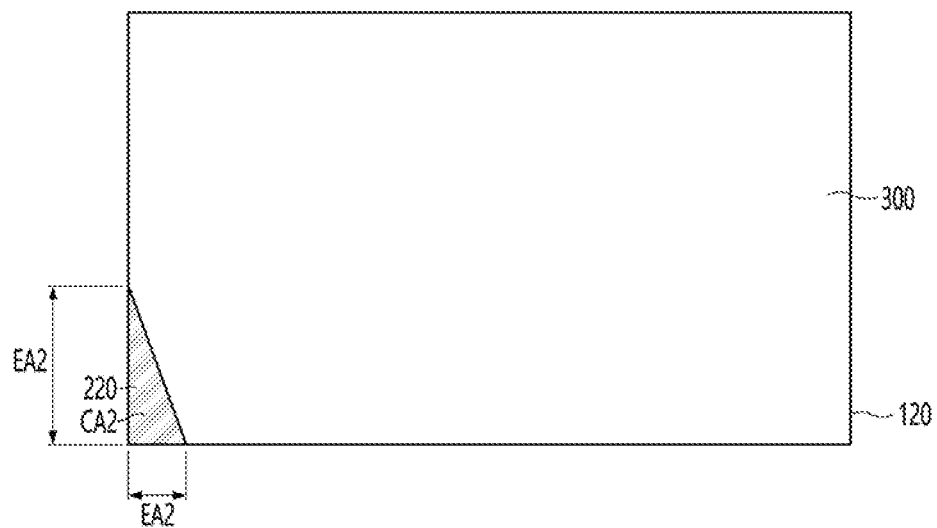

[FIG. 20]
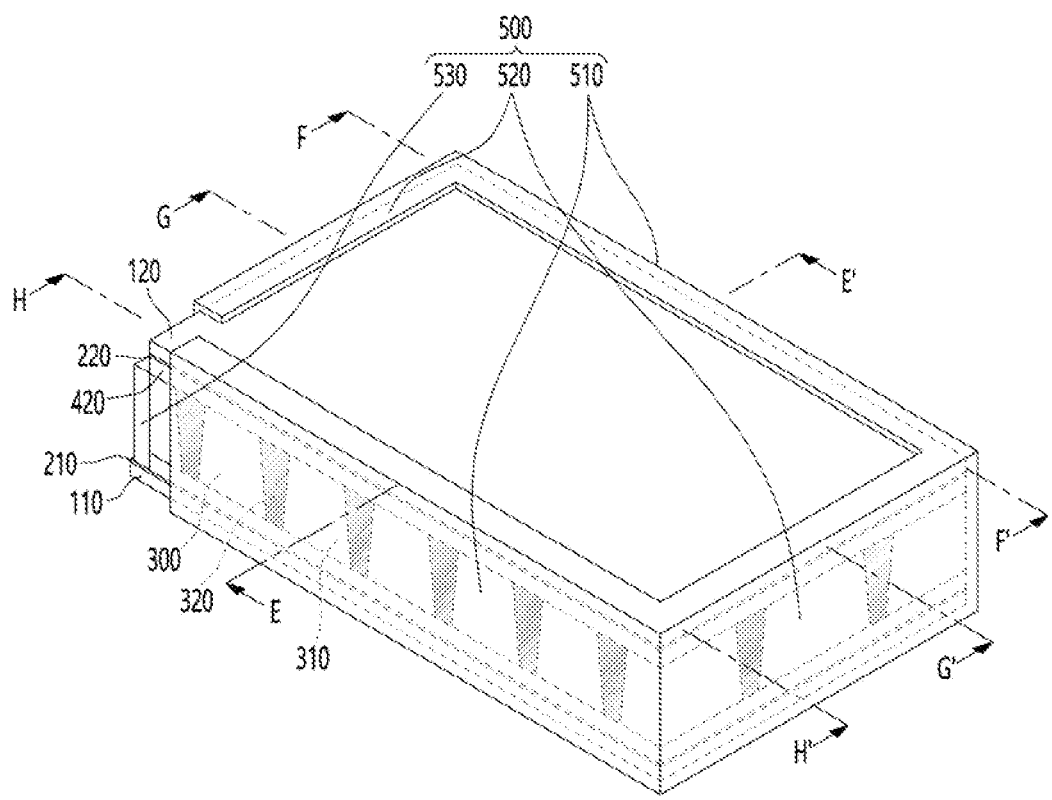
[FIG. 21]
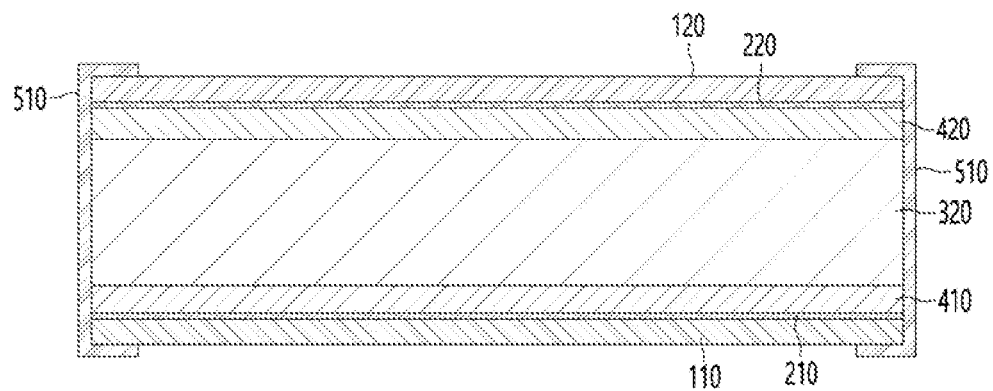

[FIG. 22]
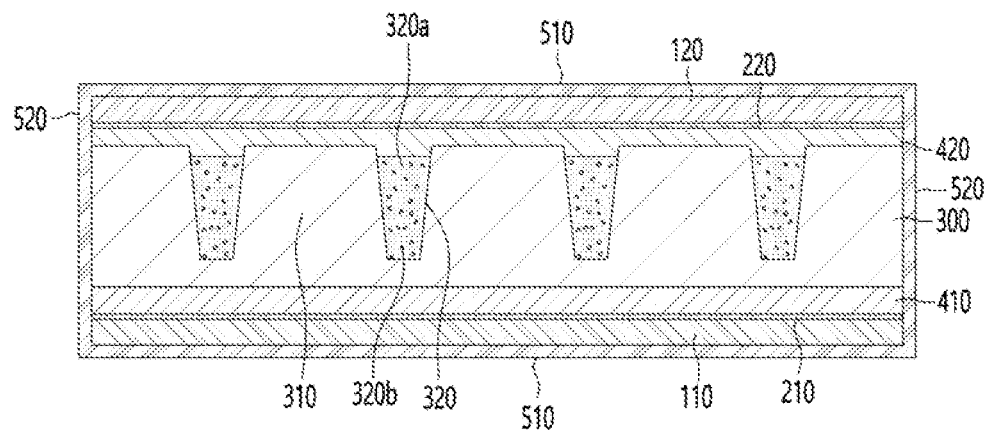
[FIG. 23]
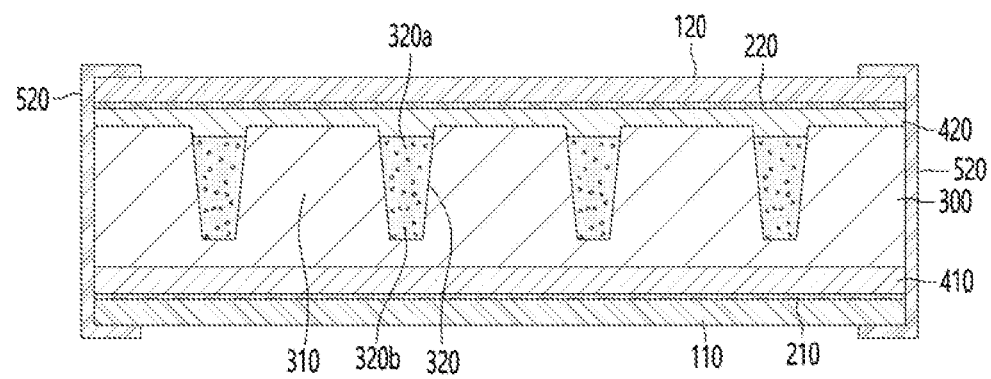
[FIG. 24]
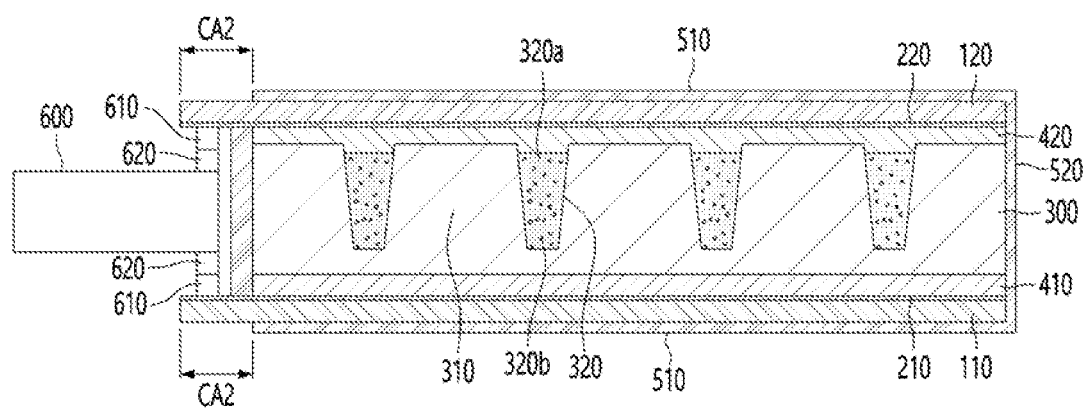

【FIG. 25】
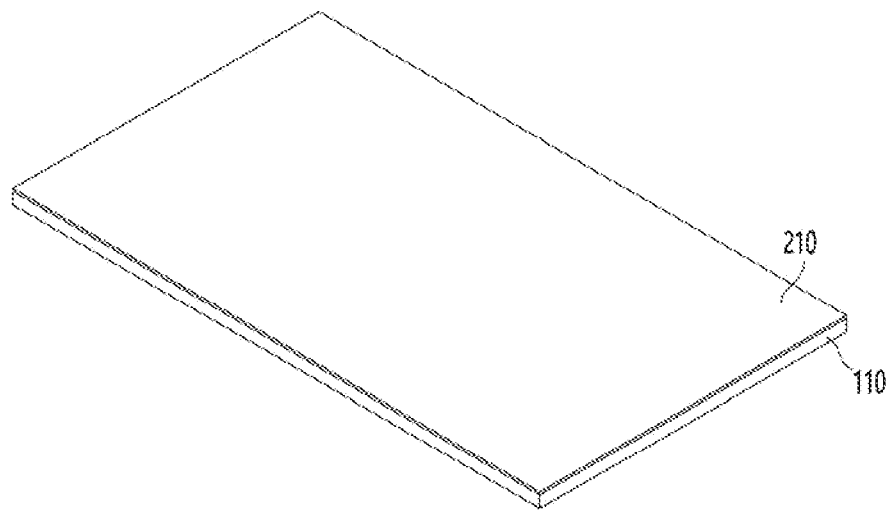
【FIG. 26】
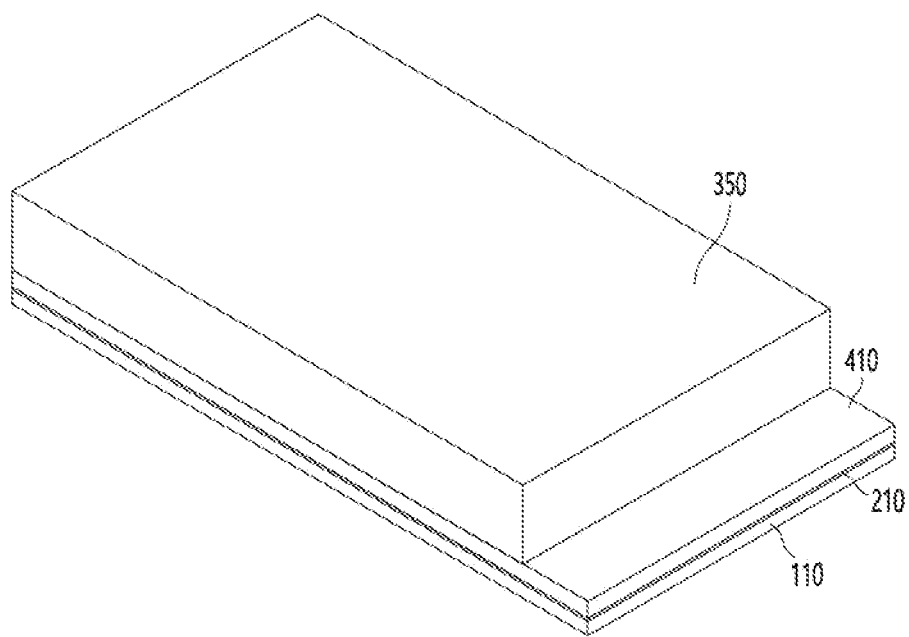

[FIG. 27]
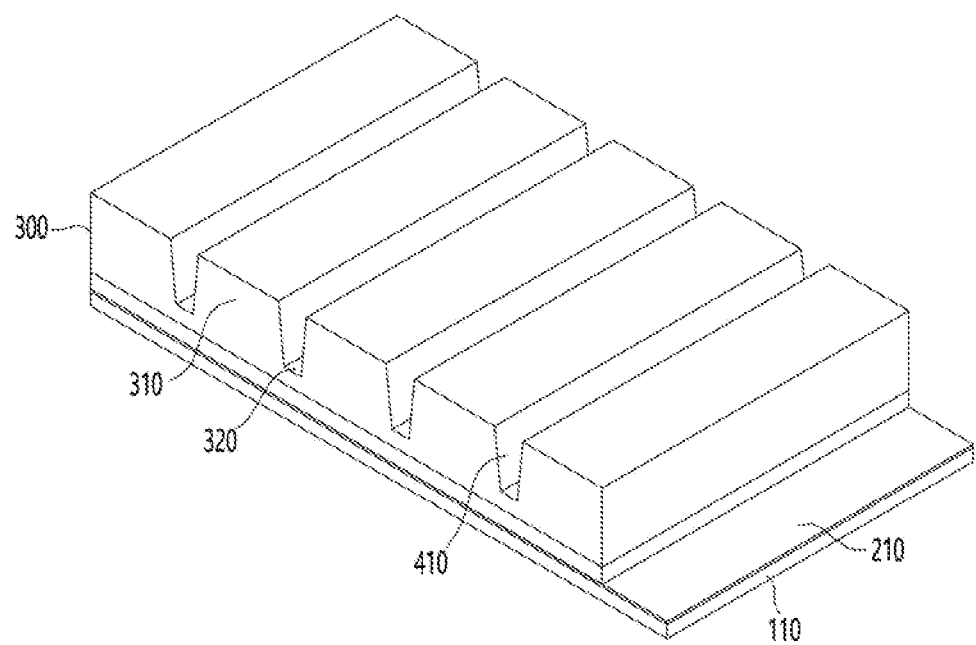
[FIG. 28]
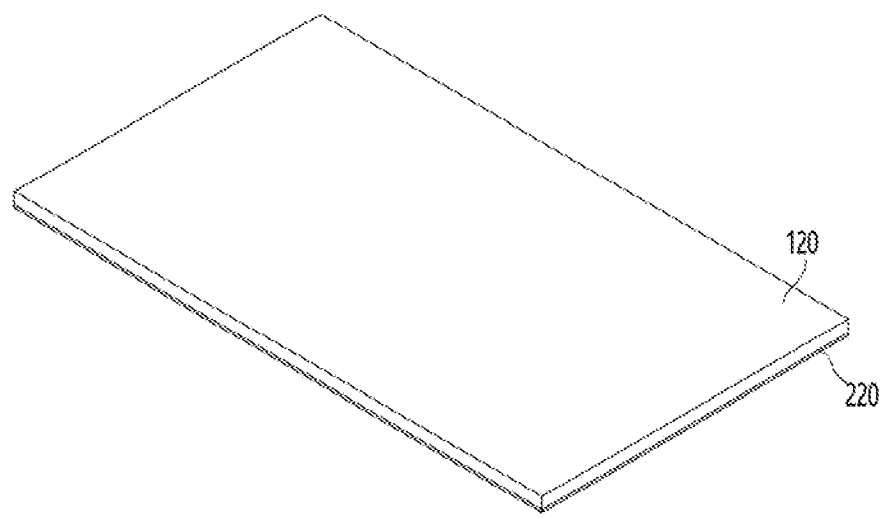

[FIG. 29]
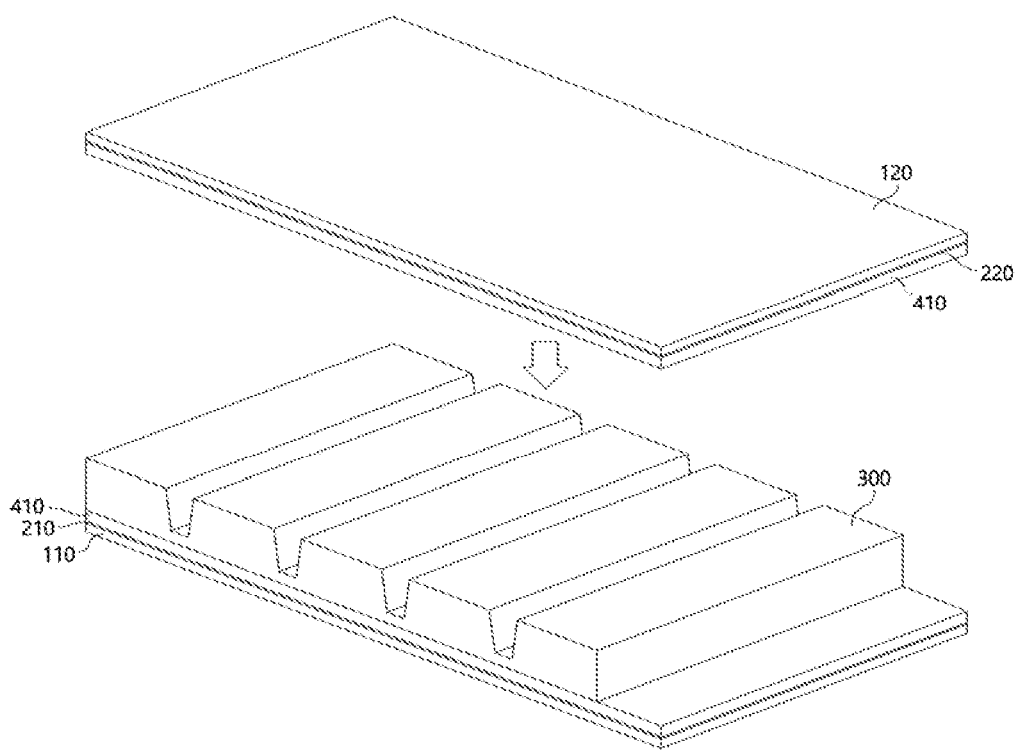
[FIG. 30]
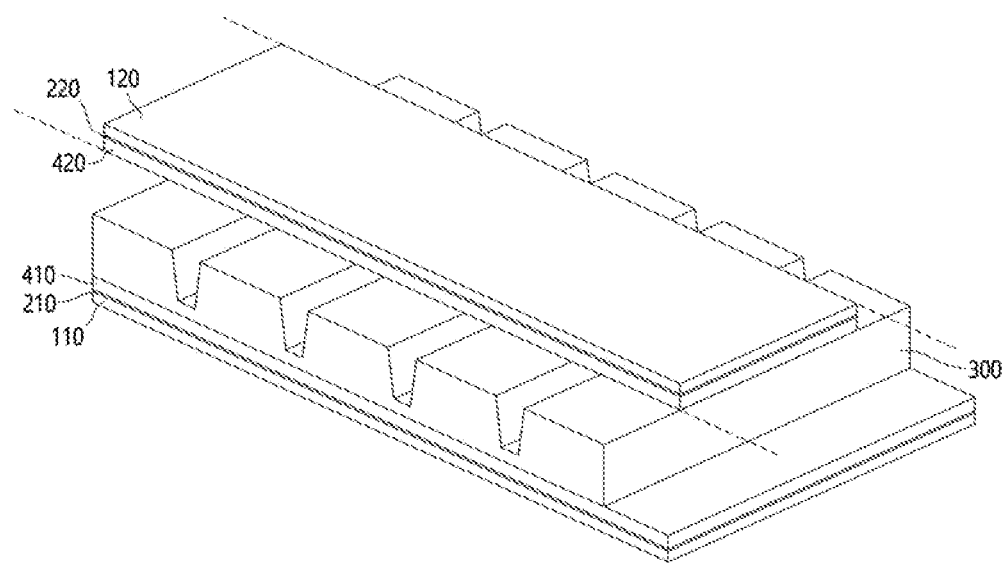

[FIG. 31]
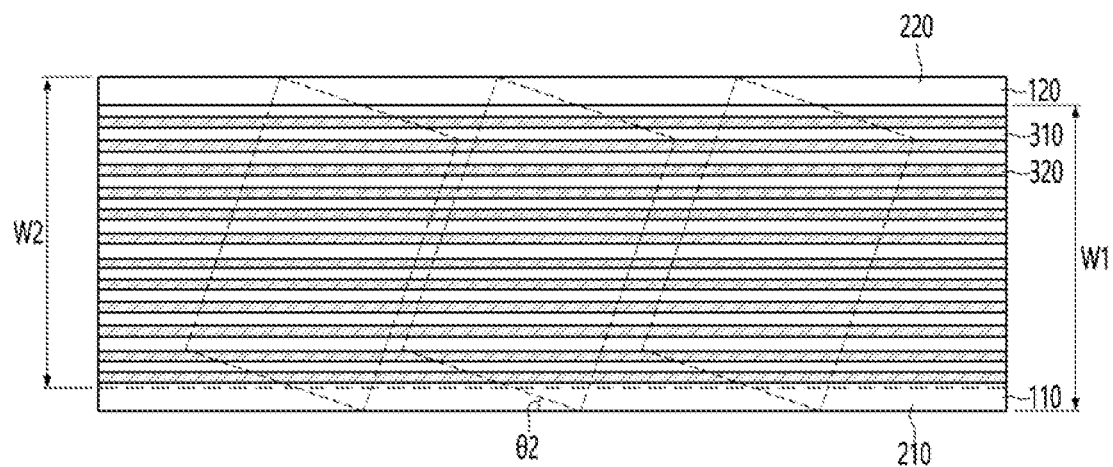
[FIG. 32]
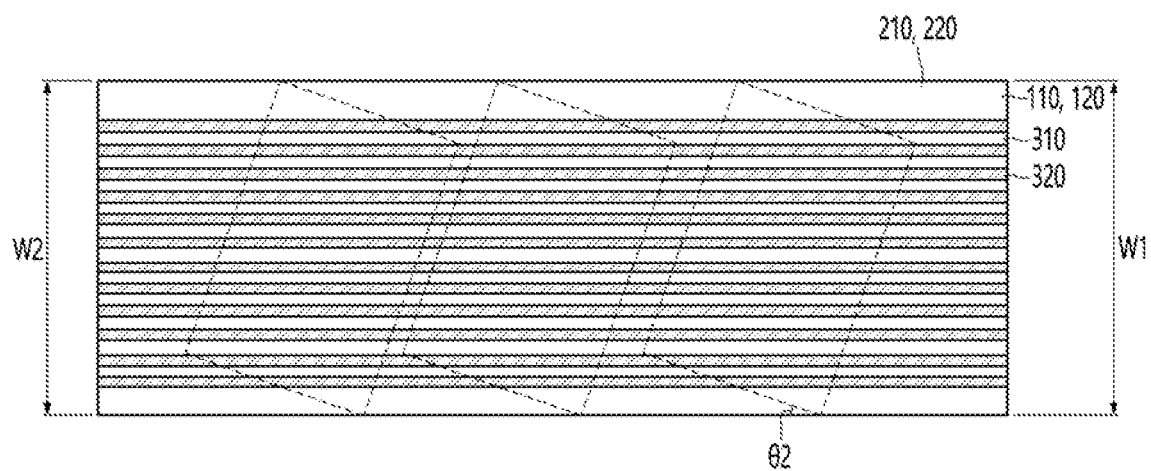

[FIG. 33]
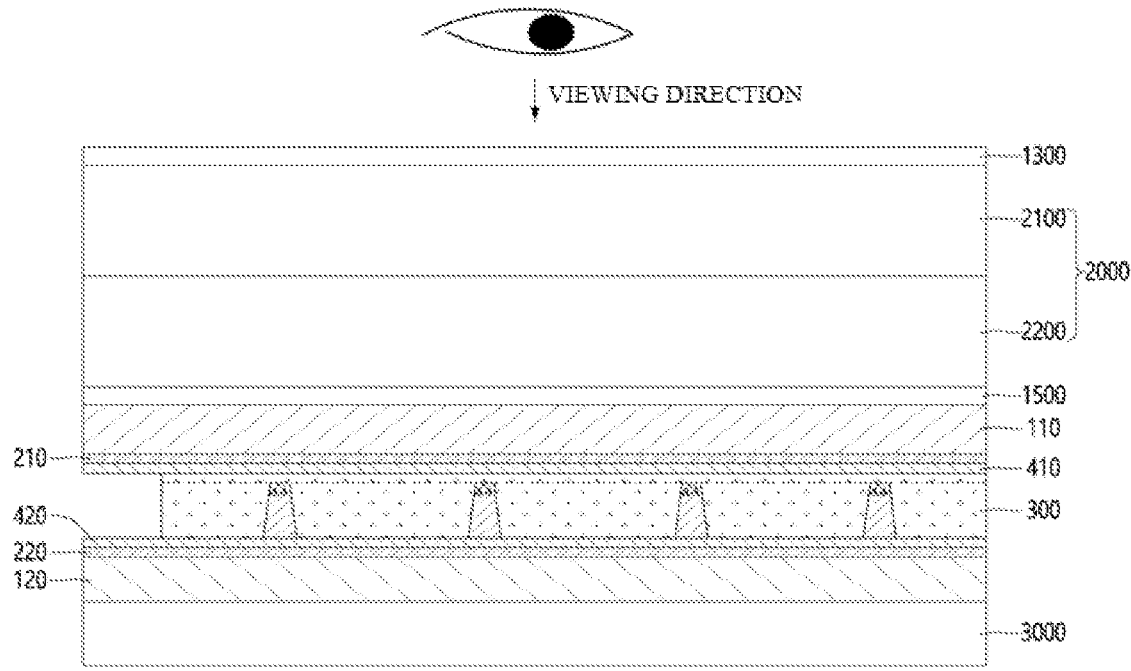
[FIG. 34]
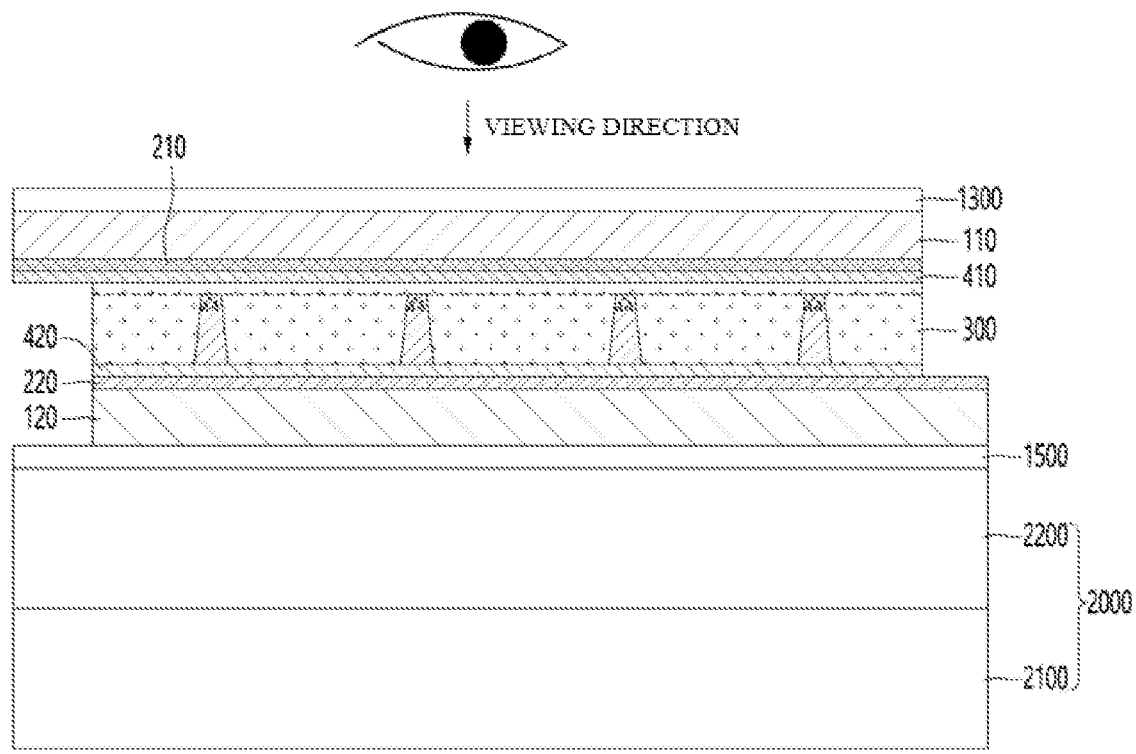

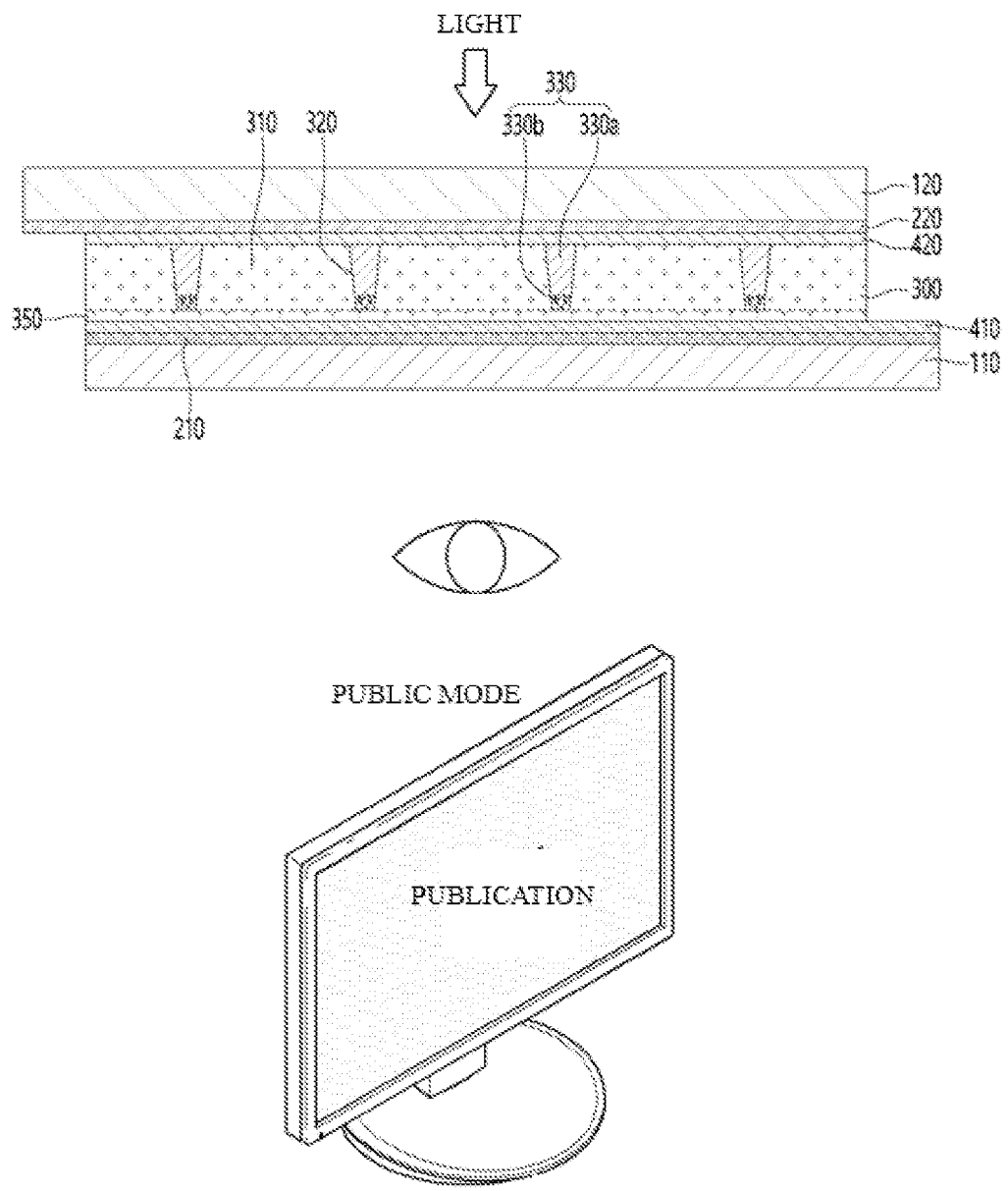
[FIG. 35]

[FIG. 36]
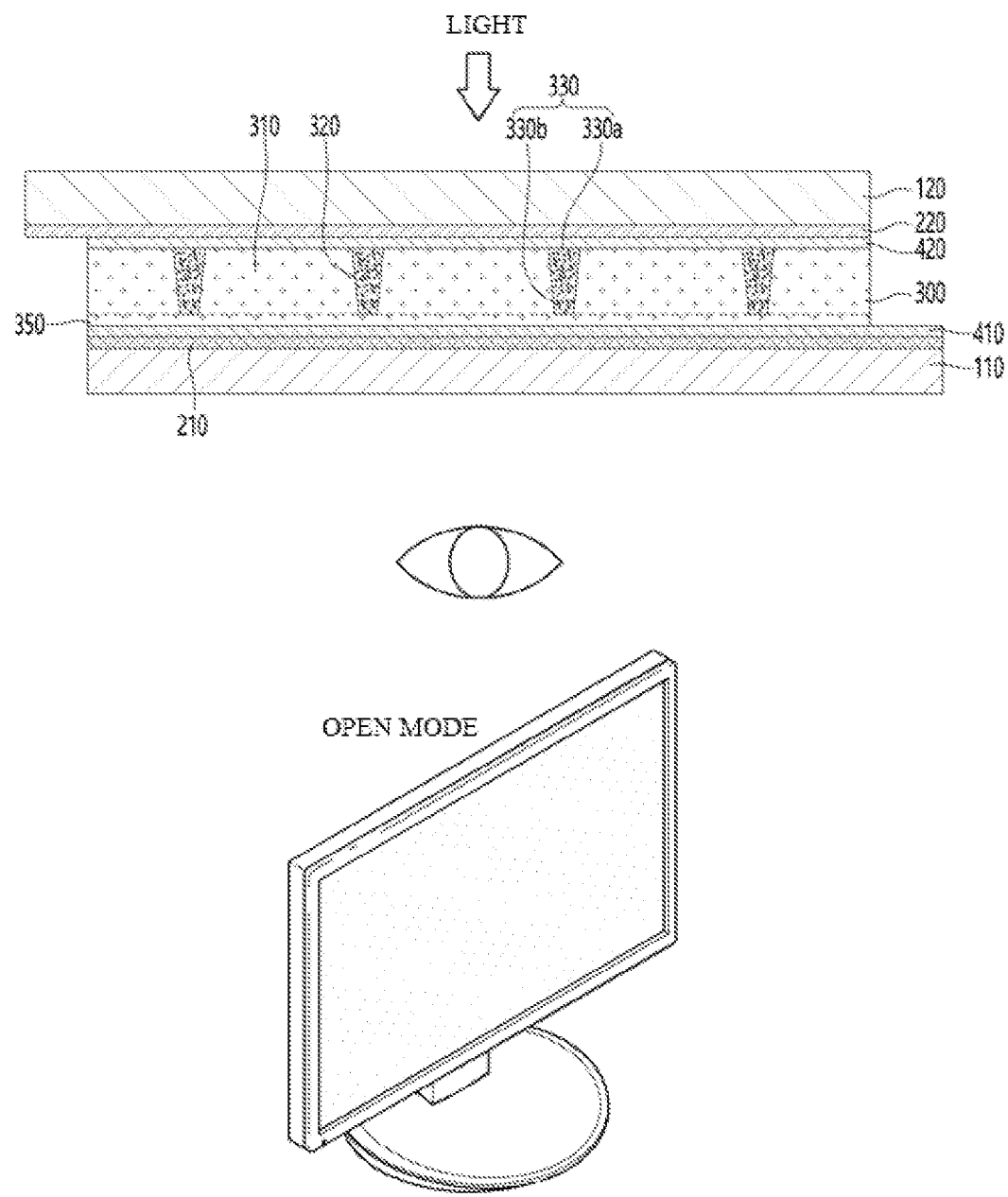

[FIG. 37]
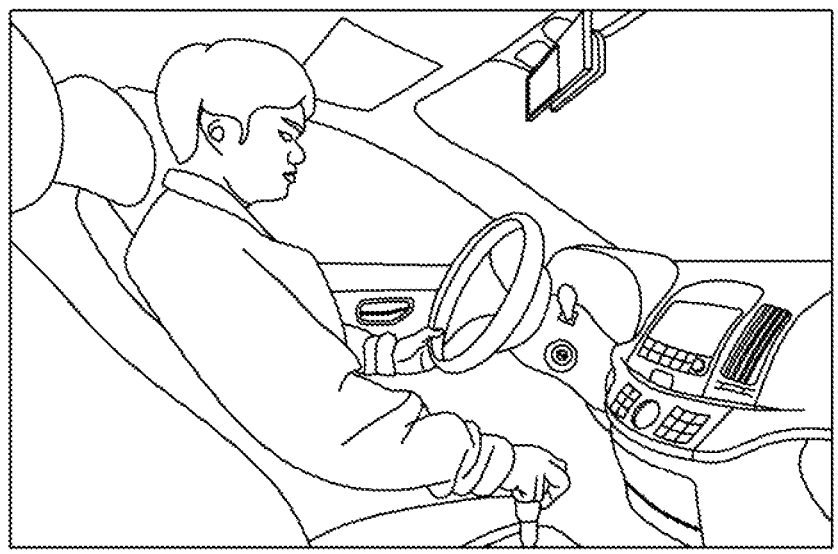

OPTICAL PATH CONTROL MEMBER AND DISPLAY DEVICE COMPRISING SAME

CROSS REFERENCE TO RELATED APPLICATIONS

This application is the National Phase of PCT International Application No. PCT/KR2021/004730, filed on Apr. 15, 2021, which claims priority under 35 U.S.C. § 119(a) to Patent Application No. 10-2020-0052131, filed in the Republic of Korea on Apr. 29, 2020 and Patent Application No. 10-2020-0055063, filed in the Republic of Korea on May 8, 2020, all of which are hereby expressly incorporated by reference into the present application.

TECHNICAL FIELD

An embodiment relates to an optical path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to prevent glare, or to prevent the inside from being visible from the outside.

That is, the light blocking film may be an optical path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by switching a pattern part to a light transmitting part and a light blocking part by filling the inside of the pattern part with particles that may move when a voltage is applied and a dispersion liquid for dispersing the particles and by dispersing and aggregating the particles.

In this case, in order to apply a voltage to the light blocking film, an electrode of the switchable light blocking film and an external power supply should be connected. Such a connection portion is an electrode connection portion, not a region controlling a viewing angle, and may be defined as a bezel region in a display device.

In addition, when the light blocking film is adhered to a display panel by a pattern portion of the light blocking film, there is a problem that a moire phenomenon occurs due to overlapping of the pattern portion of the light blocking film and a pattern portion of the display panel, thereby deteriorating visibility.

Therefore, an optical path control member having a new structure capable of preventing deterioration in visibility and reducing a bezel region is required.

DISCLOSURE

Technical Problem

An embodiment is directed to providing an optical path control member capable of increasing a display region by reducing a bezel region and improving visibility by reducing moire.

Technical Solution

An optical path control member according to an embodiment includes: a first substrate; a first electrode disposed on the first substrate; a second substrate disposed on the first substrate; a second electrode disposed under the second substrate; and a light conversion part disposed between the first electrode and the second electrode, wherein the first substrate and the second substrate include a first direction, a second direction different from the first direction, and a third direction defined as a thickness direction of the first substrate and the second substrate, the light conversion part includes a partition wall part and a reception part alternately disposed, the reception part has a light transmittance changing according to application of a voltage, the reception part extends in a fourth direction, and the reception part has a lower surface inclined at an acute angle with respect to one side surface of the first substrate.

An optical path control member according to an embodiment includes: a first substrate; a first electrode disposed on the first substrate; a second substrate disposed on the first substrate; a second electrode disposed under the second substrate; and a light conversion part disposed between the first electrode and the second electrode, wherein the first substrate and the second substrate include a first direction, a second direction different from the first direction, and a third direction defined as a thickness direction of the first substrate and the second substrate, the light conversion part includes a partition wall part and a reception part alternately disposed, the reception part has a light transmittance changing according to application of a voltage, the first substrate includes a first edge region, the second substrate includes the first edge region and a second edge region facing the first and second substrates in the thickness direction, the first electrode includes a first connection portion disposed on an edge region of the first substrate, and the second electrode includes a second connection portion disposed on an edge region of the second substrate.

Advantageous Effects

An optical path control member according to an embodiment can reduce a size of a bezel region where the optical path control member and a printed circuit board are connected.

In detail, first and second connection portions respectively connected to first and second electrodes of the optical path control member can be disposed in a first edge region of a first substrate and a second edge region of a second substrate, respectively.

Accordingly, it is possible to reduce a size of a region where a light conversion part is not disposed in the optical path control member.

That is, the optical path control member according to the embodiment can reduce a bezel region where the light conversion part that changes a viewing angle is not disposed.

In addition, since a size of a sealing part sealing the bezel region is reduced as the bezel region is reduced, when the optical path control member is combined with a display panel and applied to a display device, an effective region of a display is more increased, thereby reducing a size of a bezel region of the display device.

In addition, it is possible to prevent moire by disposing an extended shape of a reception part of the light conversion part of the optical path control member to be inclined in a predetermined angular range.

In detail, when the optical path control member is combined with the display panel and applied to the display device, a moire phenomenon, which is caused by overlapping a pattern of the display panel with the reception part, can be reduced by tilting and disposing the reception part in a predetermined angular range.

Accordingly, visibility of the display device may be improved.

In addition, by disposing a first connection portion and a second connection portion in the same direction and disposing the first and second connection portions at positions facing each other in a thickness direction of the first and second substrates, it is possible to connect both the first and second connection portions with one printed circuit board, so that it is possible to easy connect the printed circuit board to the first and second connection portions.

DESCRIPTION OF DRAWINGS

FIG. 1 is a perspective view of an optical path control member according to a first embodiment.

FIGS. 2 and 3 are a perspective view of a first substrate and a first electrode and a perspective view of a second substrate and a second electrode of the optical path control member according to the embodiment.

FIGS. 4 and 5 are views for describing arrangement of a light conversion part in the optical path control member according to the first embodiment FIG. 6 is a perspective view for describing that a sealing part is disposed on the optical path control member according to the first embodiment FIG. 7 is a cross-sectional view taken along line A-A' in FIG. 6.

FIG. 8 is a cross-sectional view taken along line B-B' in FIG. 6.

FIG. 9 is a cross-sectional view taken along line C-C' in FIG. 6.

FIGS. 10 and 11 are cross-sectional views taken along line D-D' in FIG. 6.

FIG. 12 is a top view for describing arrangement of a reception part in the optical path control member according to the first embodiment.

FIGS. 13 and 14 are cross-sectional views taken along line D-D' in FIG. 6 for describing shapes of various reception parts in the optical path control member according to the first embodiment.

FIG. 15 is another cross-sectional view taken along line D-D' in FIG. 6 in the optical path control member according to the first embodiment.

FIG. 16 is another cross-sectional view taken along line D-D' in FIG. 6 in the optical path control member according to the first embodiment.

FIG. 17 is a perspective view of an optical path control member according to a second embodiment.

FIGS. 18 and 19 are views for describing arrangement of a light conversion part in the optical path control member according to the second embodiment.

FIG. 20 is a perspective view for describing that a sealing part is disposed in the optical path control member according to the second embodiment.

FIG. 21 is a cross-sectional view taken along line E-E' in FIG. 20.

FIG. 22 is a cross-sectional view taken along line F-F' in FIG. 20.

FIG. 23 is a cross-sectional view taken along line G-G' in FIG. 20.

FIG. 24 is a cross-sectional view taken along line H-H' in FIG. 20.

FIGS. 25 to 32 are views for describing a method of manufacturing an optical path control member according to an embodiment.

FIGS. 33 and 34 are cross-sectional views of a display device to which an optical path control member according to an embodiment is applied.

FIGS. 35 to 37 are views for describing one embodiment of the display device to which the optical path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switchable optical path control member driven in various modes according to electrophoretic particles moving by application of a voltage.

Referring to FIGS. 1 to 3, an optical path control member 1000 according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 0.05 μm to 2 μm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

Referring to FIG. 2, the first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 0.1 μm to about 0.5 μm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo). gold (Au), titanium (Ti), and alloys thereof.

Referring to FIG. 3, the second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the optical path control member according to the embodiment may be improved.

The first substrate 110 and the second substrate 120 may have sizes corresponding to each other. The first substrate 110 and the second substrate 120 may have sizes the same as or similar to each other.

In detail, a first length extending in the first direction 1A of the first substrate 110 may have a size the same as or similar to a second length L2 extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction 2A of the second substrate 120.

For example, the first width and the second width may have a size of 150 mm to 200 mm.

In addition, the first width extending in the second direction 2A of the first substrate 110 and the second width extending in the second direction 2A of the second substrate 120 may be different from each other.

For example, the first width and the second width may have different sizes within a range of 150 mm to 200 mm.

In addition, a first thickness extending in the third direction 3A of the first substrate 110 may have a size the same as or similar to a second thickness extending in the third direction 3A of the second substrate 120.

For example, the first thickness and the second thickness may have a size of 30 μm to 80 μm.

Referring to FIG. 1, the first substrate 110 and the second substrate 120 may be disposed to be misaligned from each other.

In detail, the first substrate 110 and the second substrate 120 may be disposed at positions misaligned from each other in the first direction 1A. In detail, the first substrate 110 and the second substrate 120 may be disposed so that side surfaces of the substrates are misaligned from each other. In more detail, the first substrate 110 and the second substrate 120 may be disposed so that edge regions facing each other are misaligned from each other.

Accordingly, the first substrate 110 may be disposed to protrude in one direction, and the second substrate 120 may be disposed to protrude in the other direction.

That is, the first substrate 110 may include a first protrusion protruding in one direction, and the second substrate 110 may include a second protrusion protruding in the other direction.

That is, the first protrusion and the second protrusion may be disposed to be misaligned from each other. That is, the first protrusion and the second protrusion may be disposed at positions that do not overlap each other in the third direction 3A.

Accordingly, the optical path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

The light conversion part 300 may be disposed between the first substrate 110 and the second substrate 120. In detail, the light conversion part 300 may be disposed between the first electrode 210 and the second electrode 220.

An adhesive layer or a buffer layer may be disposed between at least one of between the light conversion part 300 and the first substrate 110 or between the light conversion part 300 and the second substrate 120.

For example, a buffer layer 410 may be disposed between the first substrate 110 and the light conversion part 300, and the adhesion of the first substrate 110 and the light conversion part 300 may be improved by the buffer layer 410.

In addition, an adhesive layer 420 may be disposed between the second substrate 120 and the light conversion part 300, and the second substrate 120 and the light conversion part 300 may be adhered to each other through the adhesive layer 420.

That is, the first substrate 110, the second substrate 120, and the light conversion part 300 may be adhered to each other by the buffer layer 410 and the adhesive layer 420.

The light conversion part 300 may include a plurality of partition wall parts and reception parts. Light conversion particles that move according to application of a voltage may be disposed in the reception part, and light transmission characteristics of the optical path control member may be changed by the light conversion particles.

A size of the light conversion part 300 may be smaller than a size of at least one of the first substrate 110 and the second substrate 120.

For example, an area of a lower portion of the light conversion part 300 may be smaller than an area of an upper portion of the first substrate 110. That is, the light conversion part 300 may be disposed so that an upper surface of the first substrate 110, that is, the first electrode 210 or the buffer layer 410 disposed on the first substrate 110 is partially exposed.

In addition, an area of an upper portion of the light conversion part may be smaller than an area of a lower portion of the second substrate 120. That is, the light conversion part 300 may be disposed so that a lower surface of the second substrate 120, that is, the second electrode 220 or the adhesive layer 420 disposed under the second substrate 120 is partially exposed.

For example, the light conversion part 300 may have a length of a short side and a long side based on the first direction 1A. The length of the short side of the light conversion part 300 based on the first direction 1A may be smaller than lengths of the first substrate 110 and the second substrate 120 in the first direction.

As described above, the side surfaces of the first substrate 110 and the second substrate 120 may be disposed to be misaligned from each other.

FIG. 4 is a view for describing arrangement of the first substrate 110, the first electrode 210, and the light conversion part 300.

Referring to FIG. 4, the light conversion part 300 may be disposed to partially expose the first electrode 210 or the buffer layer 410 disposed on the first substrate 110. That is, an area in contact with or corresponding to the first electrode 210 and the light conversion part 300 may be smaller than an area of an upper surface of the first electrode 210.

For example, based on the first substrate 110, the first electrode 210 or the buffer layer 410 disposed on an edge region of the first substrate 110 may be exposed. That is, a first edge region EA1 of the first substrate 110 may be defined as a region that is not in contact with the light conversion part 300. That is, the first edge region EA1 of the first substrate 110 may be defined as a region where the light conversion part 300 is not disposed. That is, the first edge region EA1 of the first substrate 110 may be a first connection portion of the first electrode connected to the printed circuit board. That is, the first edge region EA1 of the first substrate 110 may include a region where the buffer layer 410 is not disposed.

That is, the first electrode 210 may be disposed in the first edge region EA1, and the first electrode 210 may include a connection portion CA1 in which the buffer layer 410 is not disposed in the first edge region EA1.

The buffer layer 410 may not be disposed or may be partially disposed in the first edge region EA1.

That is, when the buffer layer 410 is not disposed in the first edge region EA1, the first connection portion CA1 may be defined as an entire region of the first electrode 210 corresponding to the first edge region EA1.

In addition, when the buffer layer 410 is partially disposed in the first edge region EA1, the first connection portion CA1 may be defined as a partial region where the buffer layer 410 is not disposed in the first electrode 210 corresponding to the first edge region EA1. That is, the first connection portion CA1 may be defined as a region where the first electrode 210 is exposed on the buffer layer 410 on the first edge region EA1.

That is, the first connection portion CA1 may be defined as a whole or a part of the first electrode 210 corresponding to the first edge region EA1.

FIG. 5 is a view for describing the arrangement of the second substrate 120, the first electrode 220, and the light conversion part 300.

Referring to FIG. 5, the light conversion part 300 may be disposed to partially expose the second electrode 220 or the adhesive layer 420 disposed under the second substrate 120. That is, a contact or corresponding area between the second electrode 220 and the light conversion part 300 may be smaller than an area of a lower surface of the second electrode 220.

For example, based on the second substrate 120, the second electrode 220 disposed on an edge region of the second substrate 120 may be exposed. That is, a second edge region EA2 of the second substrate 120 may be defined as a region that is not in contact with the light conversion part 300. That is, the second edge region EA2 of the second substrate 120 may be defined as a region where the light conversion part 300 is not disposed. That is, the second edge region EA2 of the second substrate 120 may be a second connection portion of the second electrode connected to the printed circuit board. That is, the second edge region EA2 of the second substrate 120 may include a region where the adhesive layer 420 is not disposed.

That is, the second electrode 220 or the adhesive layer 420 may be disposed in the second edge region EA2, and the second electrode 220 may include a second connection portion CA2 in which the adhesive layer 420 is not disposed in the second edge region EA2.

The adhesive layer 420 may not be disposed or may be partially disposed in the second edge region EA2.

That is, when the adhesive layer 420 is not disposed in the second edge region EA2, the second connection portion CA2 may be defined as an entire region of the second electrode 220 corresponding to the second edge region EA2.

In addition, when the adhesive layer 420 is partially disposed in the second edge region EA2, the second connection portion CA2 may be defined as a partial region where the adhesive layer 420 is not disposed in the second electrode 220 corresponding to the second edge region EA2. That is, the second connection portion CA2 may be defined as a region where the second electrode 220 is exposed on the adhesive layer 420 on the second edge region EA2.

That is, the second connection portion CA2 may be defined as a whole or a part of the second electrode 220 corresponding to the second edge region EA2.

The first edge region EA1 and the second edge region EA2 may be formed in a polygonal shape. For example, the first edge region EA1 and the second edge region EA2 may have a triangular shape. In detail, the first edge region EA1 and the second edge region EA2 may be formed in a triangular shape having two cut surfaces connected to each other.

The first edge region EA1 and the second edge region EA2 may not overlap each other. That is, the first edge region EA1 and the second edge region EA may not overlap each other in the third direction 3A.

Accordingly, the first connection portion CA1 disposed on the first edge region EA1 and the second connection portion CA2 disposed on the second edge region EA2 may also not overlap each other in the third direction 3A.

The first edge region EA1 and the second edge region EA2 may be disposed to face each other. In detail, the first edge region EA1 and the second edge region EA2 may be disposed to face each other in a diagonal direction. In more detail, the first edge region EA1 and the second edge region EA2 may be disposed to face each other in a direction between the first direction 1A and the second direction 2A.

Accordingly, the first connection portion CA1 disposed on the first edge region EA1 and the second connection portion CA2 disposed on the second edge region EA2 may also be disposed to face each other in the diagonal direction.

That is, the first connection portion CA1 is disposed at one end of the first substrate in the first direction, and the second connection portion CA2 is disposed at the other end of the second substrate in the first direction, so that the first connection portion CA1 and the second connection portion CA2 may not overlap each other in the third direction and may be disposed to face each other in the diagonal direction defined as a direction between the first direction and the second direction.

Hereinafter, a position of a sealing part and a position of the light conversion part of the optical path control member according to a first embodiment will be described in more detail with reference to FIGS. 6 to 14.

Referring to FIG. 6, a sealing part 500 may be disposed on an outer surface of the optical path control member. The sealing part 500 may be completely or partially disposed on side surfaces of the optical path control member in the first direction 1A and side surfaces in the second direction 2A.

The sealing part 500 may be disposed in contact with the partition wall part 310 and the reception part 320.

In detail, the sealing part 500 may include a first sealing part 510, a second sealing part 520, and a third sealing part 530. The first sealing part 510, the second sealing part 520, and the third sealing part 530 may be distinguished in accordance with positions disposed in the optical path control member.

Referring to FIGS. 6 and 7, the first sealing part 510 may be disposed on the side surfaces of the optical path control member in the first direction 1A facing each other. In detail, the first sealing part 510 may be disposed to extend along a lower surface of the first substrate 110, side surfaces of the first substrate 110, the first electrode 210, the buffer layer 410, the light conversion part 300, the adhesive layer 420, and the second electrode 220 in the first direction 1A, and an upper surface of the second substrate 120.

In addition, referring to FIGS. 6, 10 and 11, the second sealing part 520 may be disposed on the side surfaces of the optical path control member in the second direction 2A facing each other. In detail, the second sealing part 520 may be disposed to extend along the lower surface of the first substrate 110, side surfaces of the first substrate 110, the first electrode 210, the buffer layer 410, the light conversion part 300, the adhesive layer 420, and the second electrode 220 in the second direction 2A, and the upper surface of the second substrate 120.

The first sealing part 510 and the second sealing part 520 may be disposed in contact with each other. In detail, at least one end of one end and the other end of the first sealing part 510 may be disposed in contact with the second sealing part 520. Alternatively, the first sealing part 510 and the second sealing part 520 may be disposed to be spaced apart from each other.

The first sealing part 510 and the second sealing part 520 may seal the reception part 320 exposed in a lateral direction of the light converting part 300. In detail, the first sealing part 510 and the second sealing part 520 may seal the reception part 320 exposed to the side surface in the first direction 1A and the side surface in the second direction 2A of the light conversion part 300.

Accordingly, the reception part 320 may prevent penetration of external impurities such as moisture and oxygen by the first sealing part 510 and the second sealing part 520.

In addition, the third sealing part 530 may be disposed on the first electrode 210 and under the second electrode 220. In detail, the third sealing part 530 may be disposed between the first electrode 210 disposed on the first edge region and the second electrode 220 disposed on the second edge region.

Referring to FIGS. 6, 8 and 9, the third sealing part 530 may be disposed on the first electrode 210 disposed on the first edge region EA1 and may be disposed under the second electrode 220 disposed on the second edge region EA2.

That is, the third sealing part 530 may be disposed in contact with the upper surface of the first electrode 210 and the side surfaces of the buffer layer 410 and the light conversion part 300 in the second direction 2A in the first edge region EA1. Alternatively, the third sealing part 530 may be disposed in contact with the upper surface of the first electrode 210 and the side surfaces of the buffer layer 410, the light conversion part 300, and the adhesive layer 420 in the second direction 2A in the first edge region EA1.

In addition, the third sealing part 530 may be disposed in contact with the lower surface of the second electrode 220 and the side surfaces of the adhesive layer 420 and the light conversion part 300 in the second direction 2A in the second edge region EA2. Alternatively, the third sealing part 530 may be disposed in contact with the lower surface of the second electrode 220 and the side surfaces of the adhesive layer 420, the light conversion part 300, and the buffer layer 410 in the second direction 2A in the second edge region EA2.

The third sealing part 530 may be disposed to be spaced apart from the first sealing part 510. In addition, the third sealing part 530 may be disposed to be spaced apart from the second sealing part 520.

In this case, a width of the third sealing part 530 may be smaller than widths of the first edge region EA1 and the second edge region EA2. In detail, the width of the third sealing part 520 may be smaller than a long width of the first edge region EA1 and a long width of the second edge region EA2.

Accordingly, a first region where the third sealing part 530 is disposed and a second region where the third sealing part 530 is not disposed may be formed in the first connection portion CA1 on the first edge region EA1 and the second connection portion CA2 on the second edge region EA2, and the printed circuit board may be connected to the first electrode and the second electrode in the second region of the first connection portion CA1 and the second connection portion CA2.

The third sealing part 530 may strengthen sealing in the lateral direction of the light conversion part 300. In detail, the third sealing part 530 is disposed in contact with the partition wall part 310 that is the side surface of the light conversion part 300 in the second direction, and thus it is possible to prevent the inflow of impurities penetrating into the reception part through the partition wall part 310.

That is, when manufacturing the optical path controlling member according to the first embodiment, a cutting process is performed in order to manufacture a plurality of optical path controlling members, and in such a cutting process, widths of the partition wall parts of the light conversion parts on both side surfaces of each optical path controlling member may not be constant. In particular, during the cutting process, a specific optical path control member may have a partition wall part having a thin width, and accordingly, external impurities may penetrate into the reception part through the partition wall part.

Accordingly, in the optical path control member according to the first embodiment, by disposing the third sealing part on the side surface of the partition wall part in the second direction, it is possible to effectively prevent penetration of impurities due to the above reasons.

As described above, referring to FIGS. 8 and 9, the first substrate 110 and the second substrate 120 may include an edge region EA1 and a second edge region EA2 where the first electrode 210 and the second electrode 220 are exposed, respectively.

A size of the first edge region EA1 may be smaller than a size of the first substrate 110. In detail, an area of the first edge region EA1 may be smaller than an area of the first substrate 110.

In detail, the size of the area of the first edge region EA1 may be 5% or less of a total area of the first substrate 110. In more detail, the size of the area of the first edge region EA1 may be 0.5% to 5% of the total area of the first substrate 110. In more detail, the size of the area of the first edge region EA1 may be 1% to 3% of the total area of the first substrate 110.

When the size of the area of the first edge region EA1 exceeds 5% of the total area of the first substrate 110, a size of a bezel region increases, and thus a display region in which a viewing angle is changed in a display device in which the optical path control member is applied may be reduced.

In addition, when the size of the area of the first edge region EA1 is less than 0.5% of the total area of the first substrate 110, the size of the first edge region becomes too small, so that the printed circuit board and the first electrode of the first edge region may not be easily connected, and poor contact may occur, thereby deteriorating visibility of the optical path control member.

In addition, a size of the second edge region EA2 may be smaller than a size of the second substrate 120. In detail, an area of the second edge region EA2 may be smaller than an area of the second substrate 120.

In detail, the size of the area of the second edge region EA2 may be 5% or less of a total area of the second substrate 120. In more detail, the size of the area of the second edge region EA2 may be 0.5% to 5% of the total area of the second substrate 120. In more detail, the size of the area of the second edge region EA2 may be 1% to 3% of the total area of the second substrate 120.

When the size of the area of the second edge region EA2 exceeds 5% of the total area of the second substrate 120, the size of the bezel region increases, and thus the display region in which the viewing angle is changed in the display device in which the optical path control member is applied may be reduced.

In addition, when the size of the area of the second edge region EA2 is less than 0.5% of the total area of the second substrate 120, the size of the second edge region becomes too small, so that the printed circuit board and the second electrode of the second edge region may not be easily connected, and poor contact may occur, thereby deteriorating visibility of the optical path control member.

Meanwhile, the size of the first edge region EA1 and the size of the second edge region EA2 may be the same as or different from each other within the above range.

Referring to FIGS. 8 and 9, a printed circuit board 600 may be connected to each of the first edge region EA1 and the second edge region EA2. In detail, an anisotropic conductive layer 610 is disposed on the first connection portion CA1 of the first electrode 210 of the first edge region EA1 and the second connection portion CA2 of the second electrode 220 of the second edge region EA2, and a pad part 620 and the anisotropic conductive layer 610 of the printed circuit board are electrically connected to each other, so that the printed circuit board may be electrically connected to the first electrode and the second electrode.

Referring to FIGS. 10 and 11, the light conversion part 300 may include a partition wall part 310, and a reception part 320.

The partition wall part 310 may be defined as a partition wall part dividing the reception part. That is, the partition wall part 310 may transmit light as a barrier region dividing a plurality of reception parts. In addition, the reception part 320 may be defined as a variable region where the reception part 320 is switched to a light blocking part and a light transmitting part according to application of a voltage.

The partition wall part 310 and the reception part 320 may be alternately disposed with each other. The partition wall part 310 and the reception part 320 may be disposed to have different widths. For example, a width of the partition wall part 310 may be greater than that of the reception part 320.

The partition wall part 310 and the reception part 320 may be alternately disposed with each other. In detail, the partition wall part 310 and the reception part 320 may be alternately disposed with each other. That is, each of the partition wall parts 310 may be disposed between the reception parts 320 adjacent to each other, and each of the reception parts 320 may be disposed between the adjacent partition wall parts 310.

The partition wall part 310 may include a transparent material. The partition wall part 310 may include a material that may transmit light.

The partition wall part 310 may include a resin material. For example, the partition wall part 310 may include a photo-curable resin material. As an example, the partition wall part 310 may include a UV resin or a transparent photoresist resin. Alternatively, the partition wall part 310 may include urethane resin or acrylic resin.

The partition wall part 310 may transmit light incident on any one of the first substrate 110 and the second substrate 120 toward another substrate.

For example, in FIGS. 10 and 11, light may be emitted from the first substrate 110 by a light source disposed under the first substrate 110, and the light may be incident toward the second substrate 120. In this case, the partition wall part 310 may transmit the light, and the transmitted light may move toward the second substrate 120.

The reception part 320 may include the dispersion liquid 320a and the light conversion particles 320b. In detail, the reception part 320 may be filled by injecting the dispersion liquid 320a. A plurality of light conversion particles 320b may be dispersed in the dispersion liquid 320a.

The dispersion liquid 320a may be a material for dispersing the light conversion particles 320b. The dispersion liquid 320a may include a transparent material. The dispersion liquid 320a may include a non-polar solvent. In addition, the dispersion liquid 320a may include a material capable of transmitting light. For example, the dispersion liquid 320a may include at least one of a halocarbon-based oil, a paraffin-based oil, and isopropyl alcohol.

The light conversion particles 320b may be disposed to be dispersed in the dispersion liquid 320a. In detail, the plurality of light conversion particles 320b may be disposed to be spaced apart from each other in the dispersion liquid 320a.

The light conversion particles 320b may include a material capable of absorbing light. That is, the light conversion particles 320b may be light absorbing particles. The light conversion particles 320b may have a color. For example, the light conversion particles 320b may have a black-based color. As an example, the light conversion particles 320b may include carbon black.

The light conversion particles 320b may have a polarity by charging a surface thereof. For example, the surface of the light conversion particles 320b may be charged with a negative (−) charge. Accordingly, according to the application of the voltage, the light conversion particles 320b may move toward the first electrode 210 or the second electrode 220.

The light transmittance of the reception part 320 may be changed by the light conversion particles 320b. In detail, the reception part 320 may be switched to the light blocking part and the light transmitting part by changing the light transmittance due to the movement of the light conversion particles 320b. That is, the reception part 320 may change the transmittance of light passing through the reception part 320 by dispersion and aggregation of the light conversion particles 320b disposed inside the dispersion liquid 320a.

For example, the optical path control member according to the embodiment may be converted from a first mode to a second mode or from the second mode to the first mode by a voltage applied to the first electrode 210 and the second electrode 220.

In detail, in the optical path control member according to the embodiment, the reception part 320 becomes the light blocking part in the first mode, and light of a specific angle may be blocked by the reception part 320. That is, a viewing angle of the user viewing from the outside is narrowed, so that the optical path control member may be driven in a privacy mode.

In addition, in the optical path control member according to the embodiment, the reception part 320 becomes the light transmitting part in the second mode, and in the optical path control member according to the embodiment, light may be transmitted through both the partition wall part 310 and the reception part 320. That is, the viewing angle of the user viewing from the outside may be widened, so that the optical path control member may be driven in a public mode.

Switching from the first mode to the second mode, that is, the conversion of the reception part 320 from the light blocking part to the light transmitting part may be realized by movement of the light conversion particles 320b of the reception part 320. That is, the light conversion particles 320b may have a charge on the surface thereof and may move toward the first electrode or the second electrode according to the application of a voltage according to characteristics of the charge. That is, the light conversion particles 320b may be electrophoretic particles In detail, the reception part 320 may be electrically connected to the first electrode 210 and the second electrode 220.

In this case, when a voltage is not applied to the optical path control member from the outside, the light conversion particles 320b of the reception part 320 are uniformly dispersed in the dispersion liquid 320a, and the reception part 320 may block light by the light conversion particles. Accordingly, in the first mode, the reception part 320 may be driven as the light blocking part.

Alternatively, when a voltage is applied to the optical path control member from the outside, the light conversion particles 320b may move. For example, the light conversion particles 320b may move toward one end or the other end of the reception part 320 by a voltage transmitted through the first electrode 210 and the second electrode 220. That is, the light conversion particles 320b may move from the reception part 320 toward the first electrode 210 or the second electrode 220.

In detail, when a voltage is applied to the first electrode 210 and/or the second electrode 220, an electric field is formed between the first electrode 210 and the second electrode 220, and the light conversion particles 320b charged with the negative charge may move toward a positive electrode of the first electrode 210 and the second electrode 220 using the dispersion liquid 320a as a medium.

That is, when the voltage is applied to the first electrode 210 and/or the second electrode 220, as shown in FIG. 10, the light conversion particles 320b may move toward the first electrode 210 in the dispersion liquid 320a. That is, the light conversion particles 320b may move in one direction, and the reception part 320 may be driven as the light transmitting part.

Alternatively, when the voltage is not applied to the first electrode 210 and/or the second electrode 220, as shown in FIG. 11, the light conversion particles 320b may be uniformly dispersed in the dispersion liquid 320a to drive the reception part 320 as the light blocking part.

Accordingly, the optical path control member according to the embodiment may be driven in two modes according to a user's surrounding environment. That is, when the user requires light transmission only at a specific viewing angle, the reception part is driven as the light blocking part, or in an environment in which the user requires high brightness, a voltage may be applied to drive the reception part as the light transmitting part.

Therefore, since the optical path control member according to the embodiment may be implemented in two modes according to the user's requirement, the optical path control member may be applied regardless of the user's environment.

Meanwhile, referring to FIG. 12, the reception part 320 may be disposed to extend from one end to the other end of the first substrate 110 extending in the first direction. In detail, the reception part 320 may extend to be inclined at a constant inclination angle θ with respect to the second direction while extending from the one end to the other end of the first substrate 110 extending in the first direction.

Accordingly, one end and the other end of the reception part 300 may be disposed to be exposed to both a side surface in the first direction and a side surface in the second direction of the light conversion part 300.

In detail, the reception part 320 may be disposed to extend in a fourth direction 4A different from the first direction 1A, the second direction 2A, and the third direction 3A.

In addition, a lower surface of the reception part 320 may extend to have an acute angle of inclination θ with respect to one side surface of the first substrate 110.

That is, the lower surface of the reception part 320 may extend in the fourth direction 4A and may extend to have the acute inclination angle θ with respect to one side surface of the first substrate 110.

In detail, the reception part 320 may extend to be inclined at an angle of 15° or less with respect to the second direction while extending from the one end to the other end of the first substrate 110 extending in the first direction. In more detail, the reception part 320 may extend to be inclined at an angle of 3° to 13° with respect to the second direction while extending from the one end to the other end of the first substrate 110 extending in the first direction. In more detail, the reception part 320 may extend to be inclined at an angle of 5° to 11° with respect to the second direction while extending from the one end to the other end of the first substrate 110 extending in the first direction.

When the reception part 320 is inclined at an angle of less than 3° with respect to the second direction while extending from the one end to the other end of the first substrate 110 extending in the first direction, moire is generated by a pattern of the display panel coupled to the optical path control member and patterns of the reception part, thereby deteriorating visibility of the display device.

In addition, when the reception part 320 is inclined at an angle exceeding 15° with respect to the second direction while extending from the one end to the other end of the first substrate 110 extending in the first direction, the bezel region is increased by an increase in a cutting angle in a process of cutting the optical path control member, so that a size of the display region in which the viewing angle is changed in the display device may be reduced.

In addition, both ends of the outermost side of the partition wall part 310 may extend to be inclined at an angle of 15° or less with respect to the second direction while extending from the one end to the other end of the first substrate 110 extending in the first direction. In more detail, the both ends of the outermost side of the partition wall part 310 may extend to be inclined at an angle of 3° to 13° with respect to the second direction while extending from the one end to the other end of the first substrate 110 extending in the first direction. In more detail, the both ends of the outermost side of the partition wall part 310 may extend to be inclined at an angle of 5° to 11° with respect to the second direction while extending from the one end to the other end of the first substrate 110 extending in the first direction.

In addition, when the buffer layer is not disposed in the first edge region, both ends of the outermost side of the buffer layer 410 may extend to be inclined at an angle of 15° or less with respect to the second direction while extending from the one end to the other end of the first substrate 110 extending in the first direction. In more detail, the both ends of the outermost side of the buffer layer 410 may extend to be inclined at an angle of 3° to 13° with respect to the second direction while extending from the one end to the other end of the first substrate 110 extending in the first direction. In more detail, the both ends of the outermost side of the buffer layer 410 may extend to be inclined at an angle of 5° to 11° with respect to the second direction while extending from the one end to the other end of the first substrate 110 extending in the first direction.

In addition, when the adhesive layer is not disposed in the second edge region, both ends of the outermost side of the adhesive layer 420 may extend to be inclined at an angle of 15° or less with respect to the second direction while extending from the one end to the other end of the first substrate 110 extending in the first direction. In more detail, the both ends of the outermost side of the adhesive layer 420 may extend to be inclined at an angle of 3° to 13° with respect to the second direction while extending from the one end to the other end of the first substrate 110 extending in the first direction. In more detail, the both ends of the outermost side of the adhesive layer 420 may extend to be inclined at an angle of ° to 11° with respect to the second direction while extending from the one end to the other end of the first substrate 110 extending in the first direction.

Meanwhile, the reception part may be disposed in a different shape in consideration of driving characteristics and the like.

Referring to FIGS. 13 and 14, in an optical path control member according to another embodiment, both ends of a reception part 320 may be disposed in contact with a buffer layer 410 and an adhesive layer 420 unlike FIGS. 10 and 11.

For example, a lower portion of the reception part 320 may be disposed in contact with the buffer layer 410, and an upper portion of the reception part 320 may be disposed in contact with the adhesive layer 420.

Accordingly, a distance between the reception part 320 and the first electrode 210 may be reduced, so that the voltage applied from the first electrode 210 may be smoothly transmitted to the reception part 320.

Accordingly, a moving speed of the light conversion particles 320b inside the reception part 320 may be improved, and thus the driving characteristics of the optical path control member may be improved.

The optical path control member according to the first embodiment may reduce a size of a bezel region where the optical path control member and the printed circuit board are connected.

In detail, the first and second connection portions respectively connected to the first and second electrodes of the optical path control member may be respectively disposed in the first edge region of the first substrate and the second edge region of the second substrate, respectively.

Accordingly, it is possible to reduce a size of the region where the light conversion part is not disposed in the optical path control member.

That is, the optical path control member according to the embodiment may reduce a bezel region where the light conversion part that changes a viewing angle is not disposed.

In addition, since a size of the sealing part sealing the bezel region is reduced as the bezel region is reduced, when the optical path control member is combined with the display panel and applied to the display device, an effective region of a display is more increased, thereby reducing a size of a bezel region of the display device.

In addition, it is possible to prevent moire by disposing an extended shape of the reception part of the light conversion part of the optical path control member to be inclined in a predetermined angular range.

In detail, when the optical path control member is combined with the display panel and applied to the display device, a moire phenomenon, which is caused by overlapping the pattern of the display panel with the reception part, may be reduced by tilting and disposing the reception part in the predetermined angular range.

Accordingly, visibility of the display device may be improved.

FIGS. 15 and 16 are another cross-sectional views of the optical path control member according to the first embodiment. In detail, FIGS. 15 and 16 are cross-sectional views of the optical path control member excluding the sealing part.

Referring to FIGS. 15 and 16, a light conversion material positioned in the reception part 320 may have a higher height at an outer portion of the light conversion material than a central portion thereof. In detail, a height h1 at the central portion of the light conversion material may be lower than a height h2 at the outer portion thereof.

Here, the height h1 at the central portion of the light conversion material is measured at the central portion of the light conversion material positioned in the reception part 320 and may refer to a total height of the light conversion material. That is, the height h1 at the central portion of the light conversion material may refer to a total thickness at the central portion of the light conversion material. Here, the height h2 at the outer portion of the light conversion material may refer to a height difference between the central portion and the outer portion of the light conversion material.

When the height h1 of the light conversion material measured at the central portion of the light conversion material positioned in the reception part 320 is 70 μm, a difference between the height h1 of the central portion of the light conversion material and the height h2 of the outer portion of the light conversion material may be 15 μm or less. For example, when the height h1 of the light conversion material measured at the central portion of the light conversion material positioned in the reception part 320 is 70 μm, the difference between the height h1 of the central portion of the light conversion material and the height h2 of the outer portion of the light conversion material may be 10 μm or less. For example, when the height h1 of the light conversion material measured at the central portion of the light conversion material positioned in the reception part 320 is 70 μm, the difference between the height h1 of the central portion of the light conversion material and the height h2 of the outer portion of the light conversion material may be 5 μm or less. For example, when the height h1 of the light conversion material measured at the central portion of the light conversion material positioned in the reception part 320 is 70 μm, the difference between the height h1 of the central portion of the light conversion material and the height h2 of the outer portion of the light conversion material may be 2 μm or less. Accordingly, the light conversion material according to the embodiment may have excellent filling efficiency and may not reduce front transmittance.

A ratio of the height of the light conversion material measured at the central portion of the light conversion material to a height between the central portion of the light conversion material and the outer portion of the light conversion material may be 35:1 or less. For example, a ratio of a height of a light conversion material 320' measured from the central portion of the light conversion material to the height between the central portion of the light conversion material and the outer portion of the light conversion material may be 15:1 or less. For example, the ratio of the height of the light conversion material measured from the central portion of the light conversion material to the height between the central portion of the light conversion material and the outer portion of the light conversion material 320' may be 7:1 or less. For example, the ratio of the height of the light conversion material measured from the central portion of the light conversion material to the height between the central portion of the light conversion material and the outer portion of the light conversion material may be 5:1 or less. Accordingly, the light conversion material of the embodiment may have excellent filling efficiency and may not reduce the front transmittance.

Referring to FIGS. 15 and 16, an adhesive layer 420 may be disposed between the light conversion part 300 and the second electrode 220. The adhesive layer 420 may be disposed to surround an upper surface 310T of the partition wall part 310 and an upper surface of the light conversion material.

The adhesive layer 420 may be positioned between the second electrode 220 positioned on the adhesive layer 420 and the partition wall part 310 and the light conversion material positioned under the adhesive layer 420.

An upper surface of the adhesive layer 420 may have a shape different from that of a lower surface of the adhesive layer 420. The upper surface of the adhesive layer 420 may surround the second electrode 220. The shape of the upper surface of the adhesive layer 420 may be changed depending on a shape of the second electrode 220.

The shape of the adhesive layer 420 may be changed by an external force applied in an adhesion process. Accordingly, the lower surface of the adhesive layer 420 may simultaneously surround an upper end of the light conversion material 320' and an upper end of the partition wall part 310 that have a height difference.

For example, the lower surface of the adhesive layer 420 may include a first adhesive surface 420B1 in which the adhesive layer 420 and an inclined portion 312 are in contact and a second adhesive surface 420B2 in which the adhesive layer 420 and the light conversion material are in contact. Here, the first adhesive surface 420B1 may refer to a non-planar surface having a height difference between a central portion and an outer portion thereof. Here, the second adhesive surface 420B2 may refer to a non-planar surface having a height difference between a central portion and an outer portion thereof.

In the embodiment, since the upper surface 310T of the partition wall part 310 has an inclined surface, an area in which the adhesive layer 420 contacts the upper surface of the partition wall part may increase. Accordingly, reliability of the optical path control member of the embodiment may be improved.

Hereinafter, an optical path control member according to a second embodiment will be described with reference to FIGS. 17 to 24. In the description of the optical path control member according to the second embodiment, descriptions of the same as or similar to those of the optical path control member according to the first embodiment described above will be omitted. In addition, in the description of the optical path control member according to the second embodiment, the same reference numerals are assigned to the same or similar components as those of the optical path control member according to the first embodiment described above.

Referring to FIG. 17, the first substrate 110 and the second substrate 120 may be disposed to protrude with respect to the light conversion part 300.

In detail, the first substrate 110 may be disposed to protrude in one direction of the first direction 1A with respect to the light conversion part 300, and the second substrate 120 may also be disposed to protrude in one direction of the first direction 1A with respect to the light conversion part 300.

That is, the first substrate 110 may include a first protrusion protruding in one direction in the first direction 1A, and the second substrate 110 may include a second protrusion protruding in one direction in the first direction 1A.

Accordingly, the first protrusion and the second protrusion may be disposed to protrude in the same direction. That is, the first protrusion and the second protrusion may be disposed at positions overlapping each other in the third direction 3A.

Accordingly, the optical path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

FIG. 18 is a view for describing the arrangement of the first substrate 110, the first electrode 210, and the light conversion part 300.

Referring to FIG. 18, the light conversion part 300 may be disposed to partially expose the first electrode 210 disposed on the first substrate 110. That is, a contact area between the first electrode 210 and the light conversion part 300 may be smaller than an area of the upper surface of the first electrode 210.

For example, with respect to the first substrate 110, the first electrode 210 disposed an edge region of the first substrate 110 may be exposed. That is, a first edge region EA1 of the first substrate 110 may be defined as a region that is not in contact with the light conversion part 300. That is, the first edge region EA1 of the first substrate 110 may be defined as a region where the light conversion part 300 is not disposed. That is, the first edge region EA1 of the first substrate 110 may be a first connection portion of the first electrode connected to the printed circuit board. That is, the first edge region EA1 of the first substrate 110 may include a region where the buffer layer 410 is not disposed.

That is, the first electrode 210 may be disposed in the first edge region EA1, and the first electrode 210 may include a connection portion CA1 in which the buffer layer 410 is not disposed in the first edge region EA1.

The buffer layer 410 may not be disposed or may be partially disposed in the first edge region EA1.

That is, when the buffer layer 410 is not disposed in the first edge region EA1, the first connection portion CA1 may be defined as an entire region of the first electrode 210 corresponding to the first edge region EA1.

In addition, when the buffer layer 410 is partially disposed in the first edge region EA1, the first connection portion CA1 may be defined as a partial region where the buffer layer 410 is not disposed in the first electrode 210 corresponding to the first edge region EA1.

That is, the first connection portion CA1 may be defined as a whole or a part of the first electrode 210 corresponding to the first edge region EA1.

FIG. 19 is a view for describing arrangement of the second substrate 120, the first electrode 220, and the light conversion part 300.

Referring to FIG. 19, the light conversion part 300 may be disposed to partially expose the second electrode 220 under the second substrate 120. That is, a contact area between the second electrode 220 and the light conversion part 300 may be smaller than an area of a lower surface of the second electrode 220.

For example, based on the second substrate 120, the second electrode 220 disposed on an edge region of the second substrate 120 may be exposed. That is, a second edge region EA2 of the second substrate 120 may be defined as a region that is not in contact with the light conversion part 300. That is, the second edge region EA2 of the second substrate 120 may be defined as a region where the light conversion part 300 is not disposed. That is, the second edge region EA2 of the second substrate 120 may be a second connection portion of the second electrode connected to the printed circuit board. That is, the second edge region EA2 of the second substrate 120 may include a region where the adhesive layer 420 is not disposed.

That is, the second electrode 220 may be disposed in the second edge region EA2, and the second electrode 220 may include a second connection portion CA2 in which the adhesive layer 420 is not disposed in the second edge region EA2.

The adhesive layer 420 may not be disposed or may be partially disposed in the second edge region EA2.

That is, when the adhesive layer 420 is not disposed in the second edge region EA2, the second connection portion CA2 may be defined as an entire region of the second electrode 220 corresponding to the second edge region EA2.

In addition, when the adhesive layer 420 is partially disposed in the second edge region EA2, the second connection portion CA2 may be defined as a partial region where the adhesive layer 420 is not disposed in the second electrode 220 corresponding to the second edge region EA2.

That is, the second connection portion CA2 may be defined as a whole or a part of the second electrode 220 corresponding to the second edge region EA2.

The first edge region EA1 and the second edge region EA2 may be formed in a polygonal shape. For example, the first edge region EA1 and the second edge region EA2 may have a triangular shape. In detail, the first edge region EA1 and the second edge region EA2 may be formed in a triangular shape having two cut surfaces.

The first edge region EA1 and the second edge region EA2 may not overlap each other. That is, the first edge region EA1 and the second edge region EA may overlap each other in the third direction 3A.

Accordingly, the first connection portion CA1 disposed on the first edge region EA1 and the second connection portion CA2 disposed on the second edge region EA2 may also overlap each other in the third direction 3A.

The first edge region EA1 and the second edge region EA2 may be disposed in the same direction. In detail, the first edge region EA1 and the second edge region EA2 may be disposed in the same direction and may be disposed at a position overlapping each other in the third direction 3A.

That is, the first edge region EA1 and the second edge region EA2 may be disposed in the same direction and may be disposed to face each other in the third direction 3A.

Accordingly, the first connection portion CA1 disposed on the first edge region EA1 and the second connection portion CA2 disposed on the second edge region EA2 may also be disposed at a position overlapping each other in the third direction 3A That is, the first connection portion CA1 is disposed at one end of the first substrate in the first direction, and the second connection portion CA2 is disposed at the other end of the second substrate in the first direction, so that the first connection portion CA1 and the second connection portion CA2 may overlap each other in the third direction and may be disposed to face each other in the third direction 3A.

Hereinafter, a position of a sealing part and a position of the light conversion part of the optical path control member according to the second embodiment will be described in more detail with reference to FIGS. 20 to 24.

Referring to FIGS. 20 to 24, a sealing part 500 may be disposed on an outer surface of the optical path control member. The sealing part 500 may be completely or partially disposed on side surfaces of the optical path control member in the first direction 1A and side surfaces in the second direction 2A.

In detail, the sealing part 500 may include a first sealing part 510, a second sealing part 520, and a third sealing part 530. The first sealing part 510, the second sealing part 520, and the third sealing part 530 may be distinguished in accordance with positions disposed in the optical path control member.

Referring to FIG. 21, the first sealing part 510 may be disposed on the side surfaces of the optical path control member in the first direction 1A facing each other. In detail, the first sealing part 510 may be disposed to extend along a lower surface of the first substrate 110, side surfaces of the first substrate 110, the first electrode 210, the buffer layer 410, the light conversion part 300, the adhesive layer 420, and the second electrode 220 in the first direction 1A, and an upper surface of the second substrate 120.

In addition, referring to FIGS. 22 and 23, the second sealing part 520 may be disposed on the side surfaces of the optical path control member in the second direction 2A facing each other. In detail, the second sealing part 520 may be disposed to extend along the lower surface of the first substrate 110, side surfaces of the first substrate 110, the first electrode 210, the buffer layer 410, the light conversion part 300, the adhesive layer 420, and the second electrode 220 in the second direction 2A, and the upper surface of the second substrate 120.

The first sealing part 510 and the second sealing part 520 may be disposed in contact with each other. In detail, at least one end of one end and the other end of the first sealing part 510 may be disposed in contact with the second sealing part 520. Alternatively, the first sealing part 510 and the second sealing part 520 may be disposed to be spaced apart from each other.

The first sealing part 510 and the second sealing part 520 may seal the reception part 320 exposed in the lateral direction of the light converting part 300. In detail, the first sealing part 510 and the second sealing part 520 may seal the reception part 320 exposed to the side surface in the first direction 1A and the side surface in the second direction 2A of the light conversion part 300.

Accordingly, the reception part 320 may prevent penetration of external impurities such as moisture and oxygen by the first sealing part 510 and the second sealing part 520.

In addition, the third sealing part 530 may be disposed on the first electrode 210 and under the second electrode 220.

Referring to FIG. 24, the third sealing part 530 may be disposed on the first electrode 210 disposed on the first edge region EA1 and may be disposed under the second electrode 220 disposed on the second edge region EA2.

That is, the third sealing part 530 may be disposed in contact with the upper surface of the first electrode 210, the side surfaces of the buffer layer 410, the light conversion part 300, and the adhesive layer 420 in the second direction 2A, and the lower surface of the second electrode 220 in the first edge region EA1 and the second edge region EA2 overlapping each other.

The third sealing part 530 may be disposed to be spaced apart from the first sealing part 510. In addition, the third sealing part 530 may be disposed to be spaced apart from the second sealing part 520.

In this case, a width of the third sealing part 530 may be smaller than widths of the first edge region EA1 and the second edge region EA2. In detail, the width of the third sealing part 520 may be smaller than a long width of the first edge region EA1 and a long width of the second edge region EA.

Accordingly, a first region where the third sealing part 530 is disposed and a second region where the third sealing part 530 is not disposed may be formed in the first connection portion CA1 on the first edge region EA1 and the second connection portion CA2 on the second edge region EA2, and the printed circuit board may be connected to the first electrode and the second electrode in the second region of the first connection portion CA1 and the second connection portion CA2.

The third sealing part 530 may strengthen sealing in the lateral direction of the light conversion part 300. In detail, the third sealing part 530 is disposed in contact with the partition wall part 310 that is the side surface of the light conversion part 300 in the second direction, and thus it is possible to prevent the inflow of impurities penetrating into the reception part through the partition wall part 310.

That is, when manufacturing the optical path controlling member according to the second embodiment, a cutting process is performed in order to manufacture a plurality of optical path controlling members, and in such a cutting process, widths of the partition wall parts of the light conversion parts on both side surfaces of each optical path controlling member constant. In particular, during the cutting process, a specific optical path control member may have a partition wall part having a thin width, and accordingly, external impurities may penetrate into the reception part through the partition wall part.

Accordingly, in the optical path control member according to the second embodiment, by disposing the third sealing part on the side surface of the partition wall part in the second direction, it is possible to effectively prevent penetration of impurities due to the above reasons.

As described above, referring to FIG. 22, the first substrate 110 and the second substrate 120 may include an edge region EA1 and a second edge region EA2 where the first electrode 210 and the second electrode 220 are exposed, respectively.

A size of the first edge region EA1 may be smaller than a size of the first substrate 110. In detail, an area of the first edge region EA1 may be smaller than an area of the first substrate 110.

In detail, the size of the area of the first edge region EA1 may be 5% or less of a total area of the first substrate 110. In more detail, the size of the area of the first edge region EA1 may be 0.5% to 5% of the total area of the first substrate 110. In more detail, the size of the area of the first edge region EA1 may be 1% to 3% of the total area of the first substrate 110.

When the size of the area of the first edge region EA1 exceeds 5% of the total area of the first substrate 110, a size of a bezel region increases, and thus a display region in which a viewing angle is changed in a display device in which the optical path control member is applied may be reduced.

In addition, when the size of the area of the first edge region EA1 is less than 0.5% of the total area of the first substrate 110, the size of the first edge region becomes too small, so that the printed circuit board and the first electrode of the first edge region may not be easily connected, and poor contact may occur, thereby deteriorating visibility of the optical path control member.

Meanwhile, the size of the first edge region EA1 and the size of the second edge region EA2 may be the same as or different from each other within the above range.

In addition, a size of the second edge region EA2 may be smaller than a size of the second substrate 120. In detail, an area of the second edge region EA2 may be smaller than an area of the second substrate 120.

In detail, the size of the area of the second edge region EA2 may be 5% or less of a total area of the second substrate 120. In more detail, the size of the area of the second edge region EA2 may be 0.5% to 5% of the total area of the second substrate 120. In more detail, the size of the area of the second edge region EA2 may be 1% to 3% of the total area of the second substrate 120.

When the size of the area of the second edge region EA2 exceeds 5% of the total area of the second substrate 120, the size of the bezel region increases, and thus the display region in which the viewing angle is changed in the display device in which the optical path control member is applied may be reduced.

In addition, when the size of the area of the second edge region EA2 is less than 0.5% of the total area of the second substrate 120, the size of the second edge region becomes too small, so that the printed circuit board and the second electrode of the second edge region may not be easily connected, and poor contact may occur, thereby deteriorating visibility of the optical path control member.

Referring to FIG. 24, a printed circuit board 600 may be connected to each of the first edge region EA1 and the second edge region EA2. In detail, an anisotropic conductive layer 610 is disposed on the first connection portion CA1 of the first electrode 210 of the first edge region EA1 and the second connection portion CA2 of the second electrode 220 of the second edge region EA2, and a pad part 620 and the anisotropic conductive layer 610 of the printed circuit board are electrically connected to each other, so that the printed circuit board may be electrically connected to the first electrode and the second electrode.

Meanwhile, since an extending direction of the reception part of the optical path control member according to the second embodiment is the same as an extending direction of the reception part of the optical path control member according to the first embodiment, the following description will be omitted.

In the optical path control member according to the second embodiment, the first connection portion of the first electrode and the second connection portion of the second electrode to which the printed circuit board is connected may be disposed in the same direction.

Accordingly, it is possible to connect the first connection portion and the second connection portion to a single printed circuit board, thereby simplifying a process of connecting the printed circuit board and the first and second electrodes and reducing a length of a wiring connected thereto.

Hereinafter, a method of manufacturing an optical path control member according to an embodiment will be described with reference to FIGS. 25 to 32.

Referring to FIG. 25, a first substrate 110 and an electrode material for forming a first electrode are prepared. Then, the first electrode may be formed by coating or depositing the electrode material on one surface of the first substrate. In detail, the electrode material may be formed on the entire surface of the first substrate 110. Accordingly, the first electrode 210 formed as a surface electrode may be formed on the first substrate 110.

Subsequently, referring to FIG. 26, a resin layer 350 may be formed by coating a resin material on the first electrode 210. In detail, the resin layer 350 may be formed by applying a urethane resin or an acrylic resin on the first electrode 210.

In this case, before disposing the resin layer 350, a buffer layer 410 may be additionally disposed on the first electrode 210. In detail, by disposing the resin layer 350 on the buffer layer 410 after disposing the buffer layer 410 having good adhesion to the resin layer 350 on the first electrode 210, it is possible to improve the adhesion of the resin layer 350.

For example, the buffer layer 410 may include an organic material including a lipophilic group such as —CH—, an alkyl group, etc. having good adhesion to the electrode and a hydrophilic group such as —NH, —OH, —COOH, etc. having a good adhesion to the resin layer 410.

The resin layer 350 may be disposed on a partial region of the first substrate 110. That is, the resin layer 350 may be disposed in an area smaller than that of the first substrate 110. Accordingly, a region where the resin layer 350 is not disposed and the first electrode 210 is exposed may be formed on the first substrate 110. In addition, when the buffer layer 410 is disposed on the first electrode 210, a region where the buffer layer 410 is exposed may be formed.

In detail, a size of a third length extending in the first direction of the resin layer 350 may be less than a size of a first length extending in the first direction of the first substrate 110, and a size of a third width extending in the second direction may be less than or equal to a size of a first width extending in the second direction of the first substrate 110.

That is, a length of the resin layer 350 may be smaller than a length of the first substrate 110, and a width of the resin layer 350 may be equal to or smaller than a width of the first substrate 110.

Subsequently, referring to FIG. 27, the resin layer 350 may be patterned to form a plurality of partition wall parts 310 and a plurality of reception parts 320 in the resin layer 350. In detail, an engraved portion may be formed in the resin layer 350 to form an engrave-shaped reception part 320 and the emboss-shaped partition wall part 310 between the engraved portions.

Accordingly, a light conversion part 300 including the partition wall part 310 and the reception part 320 may be formed on the first substrate 110.

In addition, the buffer layer 410 exposed on the first electrode 210 may be removed to expose the first electrode 210 in a region where the first substrate 110 protrudes.

Subsequently, referring to FIG. 28, a second electrode and an electrode material for forming a second substrate 120 and are prepared. Then, the second electrode may be formed by coating or depositing the electrode material on one surface of the second substrate. In detail, the electrode material may be formed on the entire surface of the second substrate 120. Accordingly, the second electrode 220 formed as a surface electrode may be formed on the second substrate 120.

A size of the second substrate 120 may be smaller than that of the first substrate 110. In addition, the size of the second substrate 120 may be smaller than that of the resin layer 350.

In detail, a size of a second length extending in a first direction of the second substrate 120 may be greater than the third length extending in the first direction of the resin layer 350, and a size of a second width extending in a second direction of the second substrate 120 may be smaller than the size of the third width extending in the second direction of the resin layer 350.

Subsequently, referring to FIG. 29, an adhesive layer 420 may be formed by coating an adhesive material on the second electrode 220. In detail, a light-transmitting adhesive layer capable of transmitting light may be formed on the second electrode 220. For example, the adhesive layer 420 may include an optical transparent adhesive layer OCA.

The adhesive layer 420 may be disposed on a partial region of the light conversion part 300. That is, the adhesive layer 420 may be disposed in an area smaller than that of the light conversion part 300. Accordingly, a region where the adhesive layer 410 is not disposed and the light conversion part 300 is exposed may be formed on the light conversion part 300.

In detail, a size of a fourth length extending in a first direction of the adhesive layer 420 may be greater than a size of a third length extending in a first direction of the light conversion part 300, and a size of a fourth width extending in a second direction of the adhesive layer 420 may be smaller than a size of a third width extending in a second direction of the light conversion part 300.

Subsequently, referring to FIG. 30, the first substrate 110 and the second substrate 120 may be adhered. In detail, the second substrate 120 may be disposed on the light conversion part 300, and the second substrate 120 and the light conversion part 300 may be adhered through the adhesive layer 420 disposed under the second substrate 120.

Accordingly, the first substrate 110, the light conversion part 300, and the second substrate 120 may be sequentially stacked in the thickness direction of the first substrate 110, the light conversion part 300, and the second substrate 120.

In this case, since the second substrate 120 is disposed in a size smaller than the size of the resin layer 350, a plurality of partition wall parts 310 and reception parts 320 may be exposed in a region where the second substrate 120 is not disposed on the light conversion part 300.

In detail, since the size of the second width extending in the second direction of the second substrate 120 is smaller than the size of the third width extending in the second direction of the resin layer 350, the plurality of partition walls 310 and the reception part 320 may be exposed in an end region of at least one of one end and the other end facing in a width direction of the resin layer 350.

Subsequently, a light conversion material may be injected between the partition wall parts 310, that is, the reception parts 320. In detail, a light conversion material in which light absorbing particles such as carbon black are dispersed in an electrolyte solvent including a paraffinic solvent and the like may be injected between the partition wall parts, that is, the reception parts 320.

For example, after disposing a dam extending in a longitudinal direction of the light conversion part 300 on the reception part and the partition wall part of the light conversion part 300 on which the second substrate 120 is not disposed, the electrolyte solvent may be injected into the reception part 320 by a capillary injection method between the dam and a side surface of the light conversion part 300.

Then, a portion of the light conversion part for injecting the light conversion material may be cut by cutting a dotted line portion of FIG. 30.

Then, the first substrate, the second substrate, and the light conversion part may be cut to manufacture the plurality of optical path control members.

In detail, referring to FIGS. 31 and 32, the first substrate, the second substrate, and the light conversion part may be cut in a quadrangular shape.

In detail, as shown in FIG. 31, after stacking the first substrate 110 having a first width w1 and the second substrate 120 having a second width w2 to be misaligned from each other, the first substrate, the second substrate, and the light conversion part may be cut in the quadrangular shape.

Alternatively, as shown in FIG. 32, after stacking the first substrate 110 having the first width w1 and the second substrate 120 having the second width w2 to overlap each other, the first substrate, the second substrate, and the light conversion part may be cut in the quadrangular shape.

In this case, the first substrate, the second substrate, and the light conversion part may be cut while having a predetermined angle θ2.

In detail, while having an angle of 15° or less with respect to one end of the optical path control member in the longitudinal direction, the optical path control member may be cut from one end in the longitudinal direction toward the other end.

In more detail, while having an angle of 3° to 13° with respect to one end of the optical path control member in the longitudinal direction, the optical path control member may be cut from one end in the longitudinal direction toward the other end.

In more detail, while having an angle of 5° to 11° with respect to one end in the longitudinal direction of the optical path control member, the optical path control member may be cut from one end in the longitudinal direction toward the other end.

When the θ2 is at an angle of less than 3° with respect to one end of the optical path control member in the longitudinal direction, moire is generated by a pattern of the display panel coupled to the optical path control member and patterns of the reception part, thereby deteriorating visibility of the display device.

In addition, when the θ2 exceeds an angle of 15° with respect to one end of the optical path control member in the longitudinal direction, the bezel region is increased by an increase in a cutting angle in a process of cutting the optical path control member, so that a size of the display region in which the viewing angle is changed in the display device may be reduced.

For example, when cutting as shown in FIG. 29, like the optical path control member according to the first embodiment described above, a plurality of optical path control members in which the first edge region and the second edge region face each other diagonally may be formed.

Alternatively, when cutting as shown in FIG. 30, like the optical path control member according to the second embodiment described above, a plurality of optical path control members in which the first edge region and the second edge region are disposed in the same direction and face each other in the third direction may be formed.

Then, by disposing the sealing part on the outer surface of the optical path control member as shown in FIGS. 6 and 20, a final optical path control member may be formed.

Hereinafter, referring to FIGS. 33 to 37, a display device to which an optical path control member according to an embodiment is applied will be described.

Referring to FIGS. 33 and 34, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

Meanwhile, referring to FIGS. 34 and 35, one end or one end and the other end of the optical path control member may protrude, and the light conversion part may not be disposed at the protruding portion. The protrusion region is an electrode connection portion in which the first electrode 210 and the second electrode 220 are exposed, and may connect an external printed circuit board and the optical path control member through the electrode connection portion.

The display panel 2000 may include a first' substrate 2100 and a second' substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 33, the optical path control member may be disposed under the liquid crystal panel and on the backlight unit 3000, and the optical path control member may be disposed between the backlight unit 3000 and the display panel 2000.

Alternatively, as shown in FIG. 34, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 toward the first substrate 110 of the optical path control member.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection preventing polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion part of the optical path control member according to the embodiment is in a direction parallel or perpendicular to an outer surface of the second substrate, but the light conversion part is formed to be inclined at a predetermined angle from the outer surface of the second substrate. Through this, a moire phenomenon occurring between the display panel and the optical path control member may be reduced.

Referring to FIGS. 35 to 37, an optical path control member according to an embodiment may be applied to various display devices.

Referring to FIGS. 35 to 37, the optical path control member according to the embodiment may be applied to a display device that displays a display.

For example, when power is applied to the optical path control member as shown in FIG. 35, the reception part functions as the light transmitting part, so that the display device may be driven in the public mode, and when power is not applied to the optical path control member as shown in FIG. 36, the reception part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 37, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
a first substrate;
a first electrode disposed on the first substrate;
a second substrate disposed on the first substrate;
a second electrode disposed under the second substrate; and
a light conversion part disposed between the first electrode and the second electrode,
wherein the first substrate and the second substrate include a first direction, a second direction different from the first direction, and a third direction defined as a thickness direction of the first substrate and the second substrate,
wherein the light conversion part includes a partition wall part and a reception part alternately disposed,
wherein the reception part has a light transmittance that changes according to application of a voltage,
wherein the reception part extends in a fourth direction, and
wherein the reception part has a lower surface inclined at an acute angle with respect to one side surface of the first substrate.

2. The optical path control member of claim 1,
wherein the first substrate includes a first edge region,
wherein the second substrate includes a second edge region facing to the first edge region in a diagonal direction,
wherein the first electrode includes a first connection portion disposed on an edge region of the first substrate,
wherein the second electrode includes a second connection portion disposed on an edge region of the second substrate, and
wherein the light conversion part is not in contact with the first edge region and the second edge region.

3. The optical path control member of claim 2, wherein the first connection portion is disposed at one end of the first substrate in the first direction, and
wherein the second connection portion is disposed at the other end of the second substrate in the first direction.

4. The optical path control member of claim 2, further comprising:
a buffer layer disposed between the first electrode and the light conversion part; and
an adhesive layer disposed between the second electrode and the light conversion part,
wherein the first connection portion is a region where the first electrode is exposed on the buffer layer, and
wherein the second connection portion is a region where the second electrode is exposed on the adhesive layer.

5. The optical path control member of claim 2, wherein an area of the first connection portion is 0.5% to 5% of a total area of the first substrate, and
wherein an area of the second connection portion is 0.5% to 5% of a total area of the second substrate.

6. The optical path control member of claim 2, further comprising a sealing part in contact with the partition wall part and the reception part,
wherein the sealing part includes:
a first sealing part extending toward a lower surface of the first substrate, a side surface of the light conversion part in the first direction, and an upper surface of the second substrate;
a second sealing part extending toward the lower surface of the first substrate, a side surface of the light conversion part in the second direction, and the upper surface of the second substrate; and
a third sealing part disposed between the first electrode disposed on the first edge region and the second electrode disposed on the second edge region.

7. The optical path control member of claim 6, wherein the first electrode disposed on the first edge region and the second electrode disposed on the second edge region includes:
a first region in which the third sealing part is disposed; and
a second region in which the third sealing part is not disposed,
wherein the first electrode and a printed circuit board are connected in the second region of the first electrode, and wherein the second electrode and the printed circuit board are connected in the second region of the second electrode.

8. The optical path control member of claim 2, wherein the first connection portion and the second connection portion do not overlap in the third direction.

9. The optical path control member of claim 2, wherein the first connection portion and the second connection portion overlap in the third direction.

10. The optical path control member of claim 1, wherein the reception part is inclined at an angle of 3° to 13° with respect to the second direction while extending from one end to the other end of the first substrate extending in the first direction.

11. The optical path control member of claim 1, wherein the reception part includes a plurality of reception parts spaced apart from each other, and
 wherein an end of at least one of the plurality of reception parts extends toward one side surface of the first substrate.

12. The optical path control member of claim 1, further comprising a light conversion material disposed inside the reception part,
 wherein a height of a central portion is lower than a height of an outer portion in the light conversion material.

13. The optical path control member of claim 12, wherein a ratio of the height of the central portion to a height between the central portion and the outer portion is 35:1.

14. A display device comprising:
 a display panel including a light source; and
 the optical path control member of claim 1 disposed on the display panel.

15. The display device of claim 14, wherein the display panel includes a backlight unit and a liquid crystal display panel,
 wherein the optical path control member is disposed between the backlight unit and the liquid crystal display panel, and
 wherein light emitted from the backlight unit moves from the second substrate toward the first substrate.

* * * * *